(12) United States Patent
Tan et al.

(10) Patent No.: US 8,072,561 B2
(45) Date of Patent: Dec. 6, 2011

(54) TWISTED NEMATIC XLCD CONTRAST COMPENSATION WITH TILTED-PLATE RETARDERS

(75) Inventors: Kim Leong Tan, Santa Rosa, CA (US); Karen Denise Hendrix, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 789 days.

(21) Appl. No.: 12/100,024

(22) Filed: Apr. 9, 2008

(65) Prior Publication Data

US 2008/0252800 A1    Oct. 16, 2008

Related U.S. Application Data

(60) Provisional application No. 60/910,923, filed on Apr. 10, 2007.

(51) Int. Cl.
*G02F 1/1335* (2006.01)
(52) U.S. Cl. .................................................. 349/74
(58) Field of Classification Search ................... 9/74
See application file for complete search history.

(56) References Cited

U.S. PATENT DOCUMENTS

| | | | |
|---|---|---|---|
| 2,478,385 A | 8/1949 | Gaiser | 359/580 |
| 3,185,020 A | 5/1965 | Thelen | 359/586 |
| 3,463,574 A | 8/1969 | Bastien et al. | 359/588 |
| 3,565,509 A | 2/1971 | Sulzbach | 359/588 |
| 3,604,784 A | 9/1971 | Louderback et al. | 350/164 |
| 3,781,090 A | 12/1973 | Sumita | 350/164 |
| 3,799,653 A | 3/1974 | Ikeda | 350/164 |
| 3,822,926 A | 7/1974 | Dalbera et al. | 359/586 |
| 3,936,136 A | 2/1976 | Ikeda et al. | 350/1 |
| 4,313,647 A | 2/1982 | Takazawa | 350/164 |
| 4,666,250 A | 5/1987 | Southwell | 359/586 |

(Continued)

FOREIGN PATENT DOCUMENTS

EP    0621499    10/1994

(Continued)

OTHER PUBLICATIONS

Karen Hendrix et al., "Birefringent Films for Contrast Enhancement of Liquid Crystal on Silicon Projection Systems", Journal of Vacuum Science and Technology A. Vacuum, Surfaces and Films, American Institute of Physics, New York, NY, vol. 24, No. 4, Jun. 23, 2006, pp. 1546-1551.

(Continued)

*Primary Examiner* — Phu Vu
(74) *Attorney, Agent, or Firm* — Matthew A. Pequignot; Pequignot + Myers LLC

(57) ABSTRACT

Contrast compensation for a liquid crystal display projection system including a light source, a first polarizer, a liquid crystal display panel, and a second polarizer is provided using a tilted compensating plate. The compensating plate includes a first birefringent element having an optic axis oriented at a first angle to the plate normal, where the first angle is greater than zero degrees (e.g., an A-plate or O-plate), and a second birefringent element having an optic axis oriented at a second angle to the plate normal, where the second angle is substantially equal to zero degrees (e.g., a C-plate). The compensating plate is tilted relative to a plane of the liquid crystal display panel. The tilted compensating plate has been shown to provide improved contrast compensation for twisted nematic liquid crystal displays.

25 Claims, 24 Drawing Sheets

U.S. PATENT DOCUMENTS

| | | | |
|---|---|---|---|
| 5,142,393 A | 8/1992 | Okumura et al. | 349/121 |
| 5,184,237 A | 2/1993 | Iimura et al. | 349/119 |
| 5,196,953 A | 3/1993 | Yeh et al. | 349/119 |
| 5,220,447 A | 6/1993 | Yokokura et al. | 349/119 |
| 5,375,006 A | 12/1994 | Haas et al. | 359/73 |
| 5,490,006 A | 2/1996 | Masumoto et al. | 349/117 |
| 5,619,352 A | 4/1997 | Koch et al. | 349/89 |
| 5,688,566 A | 11/1997 | Broer et al. | 428/1.31 |
| 5,777,709 A | 7/1998 | Xu | 349/120 |
| 5,798,808 A | 8/1998 | Van Haaren et al. | 349/96 |
| 5,895,106 A | 4/1999 | VanderPloeg et al. | 349/120 |
| 5,986,733 A | 11/1999 | Winker et al. | 349/120 |
| 6,057,901 A | 5/2000 | Xu | 349/121 |
| 6,175,400 B1 | 1/2001 | Duncan et al. | 349/117 |
| 6,356,325 B1 | 3/2002 | Shimoshikiryo | 349/121 |
| 6,556,266 B1 | 4/2003 | Shirochi et al. | 349/118 |
| 6,585,378 B2 | 7/2003 | Kurtz et al. | 353/31 |
| 6,587,171 B1 | 7/2003 | Georges et al. | 349/120 |
| 6,805,445 B2 | 10/2004 | Silverstein et al. | 353/20 |
| 6,805,924 B1 | 10/2004 | Ishikawa et al. | 428/1.1 |
| 6,857,747 B2 | 2/2005 | Pentico et al. | 353/31 |
| 6,885,422 B2 | 4/2005 | Suzuki et al. | 349/121 |
| 6,909,473 B2 | 6/2005 | Mi et al. | 349/5 |
| 6,912,030 B1 | 6/2005 | Coates | 349/119 |
| 7,170,574 B2 | 1/2007 | Tan et al. | 349/117 |
| 7,345,723 B2 | 3/2008 | Robinson et al. | 349/117 |
| 2002/0047968 A1 | 4/2002 | Yoshida et al. | 349/117 |
| 2003/0193636 A1 | 10/2003 | Allen et al. | 349/117 |
| 2003/0231270 A1* | 12/2003 | Kume et al. | 349/119 |
| 2004/0114079 A1 | 6/2004 | Kurtz et al. | 349/117 |
| 2005/0128380 A1 | 6/2005 | Zieba et al. | 349/96 |
| 2005/0128391 A1 | 6/2005 | Tan et al. | 349/117 |
| 2006/0268207 A1 | 11/2006 | Tan et al. | 349/117 |
| 2006/0285042 A1 | 12/2006 | Chen et al. | 349/117 |

FOREIGN PATENT DOCUMENTS

| | | |
|---|---|---|
| EP | 1764644 | 8/2006 |
| WO | WO 98/37254 | 8/1998 |

OTHER PUBLICATIONS

C. Pentico, M. Newell and M. Greenberg, "Ultra high contrast color management system for projection displays," SID 03 Digest, pp. 130-133, 2003.

D. Hansen, E. Gardner, R. Perkins, M. Lines, and A. Robbins, "The display applications and physics of the Proflux wire grid polarizer," SID 02 Digest, p. 730, 2002.

D. Anderson and K. Shahzad, "Off-axis LCoS compensation for enhanced contrast," SID 03 Digest, pp. 1433-1435, 2003.

J. Chen, M.G. Robinson and G.D. Sharp, "General methodology for LCoS panel compensation," SID 04, Digest, pp. 990-993, 2004.

K. Tan et al., "Design and characterization of a compensator for high contrast LCoS projection systems," SID 2005, p. 1810, 2005.

H. Mori, et al., "Novel optical compensation method based upon a discotic optical compensation film for wide-viewing-angle LCDs," SID 03 Digest, p. 1058, 2003.

M. Duelli et al., "High performance contrast enhancing films for VAN-mode LCoS panels," SID 05 Digest, p. 892, 2005.

H. Seiberle, K. Schmitt and M. Schadt, "Multidomain LCDs and Complex Optical Retarders Generated by Photo-alignment," Proc. Eurodisplays '99, pp. 6-9, Sep. 1999.

"Birefringent Compensators for Normally White TN-LCD's", Eblen J.P. et al, Society for Information Display, SID International Papers, San Jose, Jun. 14-16, 1994; Santa Ana SID, U.S. vol. 25, pp. 245-248, XP000462707, Chapter, Design.

X.J. Yu et al., "Optical wire-grid polarizers at oblique angles of incidence," J. Appl. Phys. 93(8), Apr. 15, 2003, pp. 4407-4412.

S-Y. Lu and R. Chipman, "Interpretation of Mueller matrices based on polar decomposition," J. Opt. Soc. Am., 13, pp. 1106-1113, 1996.

J. E. Anderson et al. "Fast Van LCoS Microdisplay," SID 05 Digest, pp. 1366-1369, 2005.

S. Hashimoto et al. "SXRD (Silicon X-tal Reflective Display): A new display device for projection displays," SID 05 Digest, pp. 1362-1365, 2005.

Sergan et al. "Measurement and modeling of optical performance of wire grids and liquid-crystal displays utilizing grid polarizers," J. Opt. Soc. Am. A, 19(9), p. 1872, 2002.

J. Chen, M.G. Robinson, D.A. Coleman, and G.D. Sharp, "Impact of the Orientation of Panel Pretilt Directional and Quarter-wave Plate on LCoS Projection System Contrast," SID 06, Digest, pp. 1606-1609, 2006.

T. Bachels, J. Funfschilling, H. Seiberle, M. Schadt, G. Gomez, and E. Criton, "Novel Photo-aligned LC Polymer Wide View Film for TN Displays," Eurodisplay 2002 p. 183.

J. Chen, K.C. Chang, J. DelPico, H. Seiberle and M. Schadt, "Wide viewing angle Photoaligned Plastic Films for TN-LCDS," SID 99 Digest, p. 98-101, 1999.

H. Hatoh, M. Ishikawa, Y. Hisatake and J. Hirata, T. Yamamoto, SID '92 Digest, p. 401, 1992.

H. Mori, Y. Itoh, Y. Nishiura, T. Nakamura and Y. Shinagawa, *Jpn. J Appl. Phys.*, 36, p. 143-147, 1997.

H. Seiberle, K. Schmitt and M. Schadt, Multidomain LCDs and complex optical retarder generated by photo-alignment, *Proceedings Euro Display '99*, p. 121-125, 1999.

K. Vermeirsch, J. Fornier, A. De Meyere, "Viewing angle improvement based on Poincare sphere representation", SID 98 Digest p. 989-992 1998.

European Search Report for corresponding EP application No. 08153826.6, Oct. 16, 2009.

* cited by examiner

US 8,072,561 B2

TWISTED NEMATIC XLCD CONTRAST COMPENSATION WITH TILTED-PLATE RETARDERS

CROSS-REFERENCE TO RELATED APPLICATIONS

This application claims priority from U.S. Provisional Application No. 60/910,923 filed Apr. 10, 2007, entitled "Twisted Nematic xLCD Contrast Compensation With Tilted-Plate Retarders" by Tan et al., which is hereby incorporated by reference.

MICROFICHE APPENDIX

Not Applicable.

TECHNICAL FIELD

The present application relates generally to retarder compensators for liquid crystal displays, and in particular, to tilted-plate retarder compensators and twisted nematic transmissive liquid crystal display systems including the same.

BACKGROUND OF THE INVENTION

Several micro-display projection (MDP) technologies are currently available in the market place targeting 40" to 70" TV screen diagonal sizes. For example, digital light processor (DLP) based projectors incorporate binary intensity modulation at the pixel level and typically rely on a single panel to temporally multiplex (in a time-sequential manner) red, green and blue (RGB) color channel information of an image. On the other hand, both transmissive liquid crystal display (xLCD) and liquid crystal on silicon (LCOS) projectors utilize the electro-optic effect of a switchable LC layer to provide pixel-level modulation. Since the fabrication of polarization-based xLCD and LCoS MDP panels are typically lower cost and higher yield than the fabrication of millions of hinged micro-mirrors on a DLP backplane, both XLCD and LCoS optical engines are often configured with a three-panel architecture, where the RGB color channels are simultaneously displayed and converged before being projected to a screen. While LCoS panels may be based on either twisted-nematic (TN) or vertical-aligned nematic (VAN) liquid crystal (LC) layers, VAN-mode LC technology is generally more prevalent in commercial LCoS based projectors. Although the industry is transitioning to VAN-mode LC in xLCD panels, the prevalent LC mode of operation in xLCD panels is TN.

Optical engines using three TN xLCD panels have been promoted under the "3LCD" industry forum. A sub-system of the 3LCD architecture is schematically illustrated in FIG. 1, which shows an image modulation segment of a typical 3-panel light engine. The optical sub-system 100 includes input pre-polarizers 101a, 101b, 101c, retarder compensators 103a, 103b, 103c, xLCD panels 104a, 104b, 104c, and exit clean-up polarizers 105a, 105b, 105c. The center element of the optical sub-system 100 is an X-cube 110, where three separate light beams 120a, 120b, 120c are aggregated and emitted as a converged light beam 130, which is projected onto a screen (not shown). The three separate light beams provide the RGB channel data. In general, the green channel often corresponds to the first light beam 120a so that it is directed at the transmitted port of the X-cube. For each color channel, the xLCD panel 104a/104b/104c is positioned between a set of crossed polarizers (e.g., between an input pre-polarizer 101a/101b/101c and an exit clean-up polarizer 105a/105b/105c, respectively). In the schematic shown, the input pre-polarizers 101a, 101b, 101c have their transmission axes aligned horizontal (parallel to plane of drawing), while the exit clean-up polarizers 105a, 105b, 105c have their transmission axes aligned vertical. The arm of the optical sub-system 100 corresponding to the green or 'a' channel typically includes a half-waveplate (HWP) 106 to convert the modulated vertically polarized light to horizontally polarized light so that it appears as P-polarized light with respect to the X-cube hypotenuse and is transmitted through the X-cube. Alternatively, if the xLCD panel 104a rotates the incoming vertical polarization to horizontal polarization in the on-state, the HWP 106 may be positioned in another arm of the optical sub-system 100.

The retarder compensators 103a, 103b, 103c are compensating elements used to improve the contrast level of the xLCD MDP system, which is otherwise reduced when the panel is viewed obliquely. For example, it is well known that the refractive index anisotropy in TN-mode LCD panels degrades the viewing angle characteristic of the xLCD MDP system. In the absence of retarder compensators 103a, 103b, 103c, the xLCD native panel contrast is typically a few hundred to one. With the retarder compensators 103a, 103b, 103c, the compensated xLCD panel contrast is substantially higher.

Conventionally, the retarder compensators 103a, 103b, 103c have been fabricated out of stretched organic foil, such as Fuji's Wide View (WV) film, which consists of a discotic layer on a triacetate cellulose (TAC) substrate. The use of stretched organic foils as retarder compensators in MDP systems is likely rooted to the use of the same in the direct view LCD industry, where large screen areas (e.g., 2.5 inches or larger) need to be compensated for contrast and/or to improve viewing angle. However, in MDP applications, the increased light flux may result in premature degradation of these organic retarder compensators. In addition, the uniformity and surface quality specifications required for small screen areas (e.g., 2.5 inches or smaller) is not always met with these organic retarder compensators. Accordingly, a more reliable retarder technology as a contrast enhancement solution is desired.

One such solution was proposed in US Pat. Appl. No. 20060268207, the entire contents of which are hereby incorporated by reference. In this reference, Tan et al disclose using a tilted C-plate retarder as a contrast enhancer in both transmissive (e.g., XLCD) and reflective (e.g., LCoS) MDP systems. The tilted C-plate retarder is fabricated with vacuum coated dielectric layers, and thus exhibits high reliability and high retardance uniformity. Notably, using vacuum coated dielectric layers to form a C-plate element is also described in U.S. Pat. No. 7,170,574, with is also hereby incorporated by reference.

Referring to FIG. 2, the optics of one arm of the prior art xLCD MDP system using a tilted C-plate retarder compensator is shown. In this sub-system 200, a cone of light output from a prior stage light pipe (or other homogenizer such as Fly's Eye Array, not shown), is linearly polarized by the pre-polarizer 201. The transmission axis 220 of the pre-polarizer 201, which can be aligned arbitrarily over the entire circle, is typically aligned at ±45', 0° or 90° with respect to the x-axis (shown aligned at 0°). Light transmitted through the pre-polarizer 201 is passed through the retarder compensator 203 and the xLCD imager 204, the latter of which typically has its slow axis 230 aligned at ±45° azimuthal offset 235 versus the pre-polarizer transmission axis 220. Light passed through the xLCD imager 204 is then transmitted to a post-analyzer 205, which typically has its transmission axis 221 aligned perpendicular to the pre-polarizer axis 220.

While this optical system 200 is shown to include only one retarder compensator 203, which is disposed between the pre-polarizer 201 and the xLCD imager 204, alternate embodiments provide one or more stages of retarder compensator that may be inserted anywhere between the pre-polarizer 201 and the post-analyzer 205. For example, in another embodiment the retarder compensator 203 is disposed between the xLCD imager 204 and the post-analyzer 205. In yet another embodiment a first retarder compensator 203 is provided between the pre-polarizer 201 and the xLCD imager 204, while a second retarder compensator (not shown) is provided between the xLCD imager 204 and the post-analyzer 205.

In each case, the retarder compensator 203 includes a C-plate retarder mounted at an angle to the x-y plane. More specifically, the C-plate retarder 203 is tilted such that it is aligned at a polar angle tilt 211 with respect to the system x-axis and at a polar angle tilt 212 with respect to the system y-axis. This two-dimensional tilt sets the axis of rotation 240 at azimuthal angle 245 with respect to the x-axis. The axis of rotation 240 is parallel to the plane of the xLCD imager 204 and parallel to the system x-y-plane. The z-axis is the propagation axis of the principal ray, which is also referred to as the transmission axis.

The assignment of fast/slow axes of the tilted C-plate retarder 203 relative to the axis of rotation 240 is dependent on the sign of C-plate retardance. For a −C-plate, the slow axis (SA) lies on the tilted surface at azimuthal angle 245, which is nominally perpendicular to the imager SA 235. For a +C-plate, the fast axis (FA) lies on the tilted surface at azimuthal angle 245, which is nominally parallel to the imager SA 235. The terms "nominally perpendicular" and "nominally parallel" are used to reflect the common practice in retardation compensation of rotating or clocking the retarder compensator SA from perpendicular alignment relative to the imager SA 235 by small value.

Advantageously, the tilt of the −C-plate introduces a net retardance, as seen by the principal ray, having a magnitude that provides compensation for the residual in-plane retardance of the xLCD panel in the dark state. In addition, the form-birefringent coating on the tilted C-plate provides a retardance profile (with incident angle) that provides compensation for the residual out-of-plane retardance of the xLCD panel in the dark state. In other words, a single −C-plate-only component is used to provide both on-axis and off-axis retardance compensation for the xLCD MDP system, thus providing a high contrast image with minimal components.

While the tilted C-plate-only retarder compensator has shown potential for use in both LCoS and xLCD MDP systems, where its durability in high light flux environments and highly uniform retardance characteristics are advantageous, it is limited in that it does not allow for the decoupling of the fast/slow axes from the geometric tilt-plane. In fact, the tilted C-plate retarder is a geometric retarder, wherein the FA and SA are set by the plane of incidence (e.g., as discussed above, the SA plane in the tilted −C-plate is the tilt plane).

Since the SA and FA are set by the plane of incidence, it is more challenging to fabricate a geometric retarder having a linear retardance profile that matches the linear retardance requirements of a given panel (e.g., which may exhibit a characteristic asymmetry in its conoscopic linear retardance profile along one of the slow or fast axes).

It would be advantageous to provide a retarder compensator that provides similar durability and/or retardance uniformity characteristics provided by the tilted C-plate retarder compensator, wherein the FA and SA are not determined by the plane of incidence.

SUMMARY OF THE INVENTION

The instant invention relates to a retarder compensator including one or more −C-plate elements coupled to a tilted O-plate element or a tilted A-plate element. Since the O-plate element and/or A-plate element can be fabricated from an inorganic birefringent crystal while the one or more −C-plate elements can be fabricated with vacuum coated dielectric layers, the resulting compound retarder typically exhibits high reliability and/or high retardance uniformity.

In addition, the retarder compensator including one or more −C-plate elements coupled to the tilted O-plate element functions as a Cartesian retarder. In particular, the in-plane fast- and slow-axes of the retarder compensator are defined by the in-plane retarder layer (e.g., the A-plate or O-plate retarder). Advantageously, these axes can be suitably aligned to match to the requirements of a given xLCD panel, while the retardance slope of the xLCD panel can be complemented by the oblique configuration of the retarder layer and/or oblique orientation of the retarder compensator.

In accordance with one aspect of the instant invention there is provided a liquid crystal display projection system comprising: a light source; a first polarizer for receiving light from the light source, the first polarizer having a transmission axis oriented to transmit light having a first polarization; a liquid crystal display panel for receiving light transmitted through the first polarizer and for selectively modulating said transmitted light; a second polarizer for receiving light transmitted through the liquid crystal display panel, the second polarizer having a transmission axis oriented substantially perpendicular to the transmission axis of the first polarizer; and a compensating plate including: a first birefringent element having an optic axis oriented at a first angle to the plate normal, the first angle greater than zero degrees; a second birefringent element having an optic axis oriented at a second angle to the plate normal, the second angle substantially equal to zero degrees, wherein the compensating plate is tilted relative to a plane of the liquid crystal display panel.

In accordance with another aspect of the instant invention there is provided a method of improving contrast ratio in a liquid crystal display projection system, the method comprising: providing a compensating plate including a first birefringent element having an optic axis oriented at a first angle to the plate normal, the first angle greater than zero degrees, and a second birefringent element having an optic axis oriented at a second angle to the plate normal, the second angle substantially equal to zero degrees; and positioning the compensating plate such that it is tilted relative to a liquid crystal display panel in the liquid crystal display projection system.

In accordance with another aspect of the instant invention there is provided a liquid crystal display projection system comprising: a light source; a first polarizer for receiving light from the light source, the first polarizer having a transmission axis oriented to transmit light having a first polarization; a liquid crystal display panel for receiving light transmitted through the first polarizer and for selectively modulating said transmitted light; a second polarizer for receiving light transmitted through the liquid crystal display panel, the second polarizer having a transmission axis oriented substantially perpendicular to the transmission axis of the first polarizer; and a compensating plate including: a first birefringent element having uniaxial O-plate symmetry; a second birefringent element having uniaxial C-plate symmetry; wherein the compensating plate is tilted relative to a plane of the liquid crystal display panel.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

In order to provide a more comprehensive understanding of retarder compensators and their use in TN-mode xLCD MDP systems, the following theoretical and/or experimental data is presented.

A 90 degree normally-white (NW) TN cell (TN90) is designed to provide for adiabatic waveguiding in the on-state (e.g., undriven) either as e- or o-waveguiding. In the absence of an applied voltage, the polarization of the incident light rotates with the twist angle of the LC directors, which undergo a smooth 90 degree twist, such that the transmitted light is emitted with a polarization orthogonal to the polarization of the incident light. In the off- or dark-state, the electrostatic field generated by the applied voltage aligns the LC directors along the transmission axis of the cell (e.g., homeotropic alignment) such that the polarization of the incident light does not change upon passing through the LC cell. Note that while the entire cell is often described as having homeotropic alignment in the off-state, it is generally only the interior or mid-section of the LC cell that is truly homeotropic, since the LC directors close to the exit and entrance sections of the cell are influenced by the anchoring forces of the alignment layers (e.g., on the thin-film-transistor (TFT) substrate and the counter-substrate).

Figure 1:
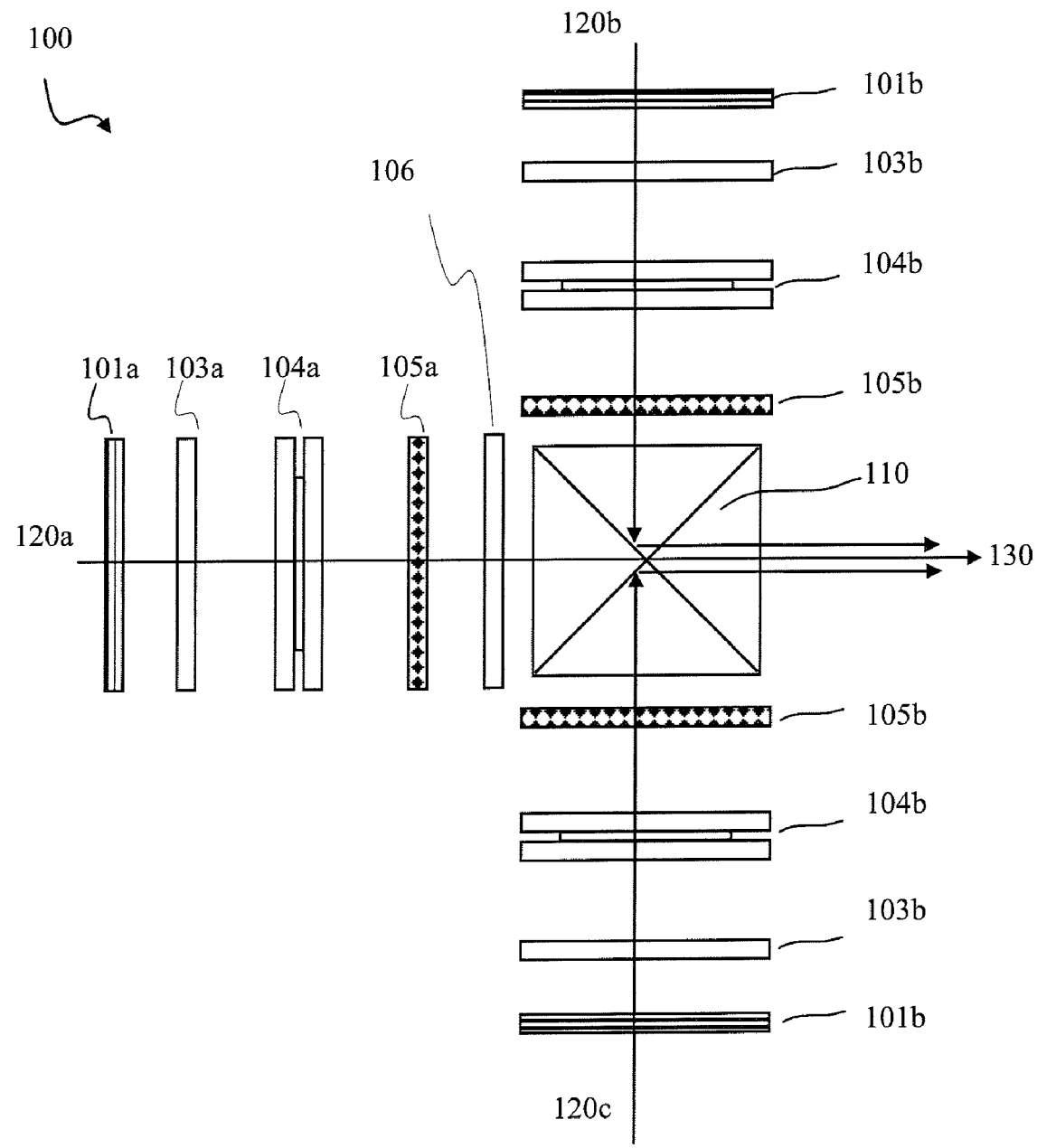
FIG. 1 is a schematic diagram of a three-channel transmissive light engine including three xLCD microdisplays and three retarder compensators.
Figure 2:
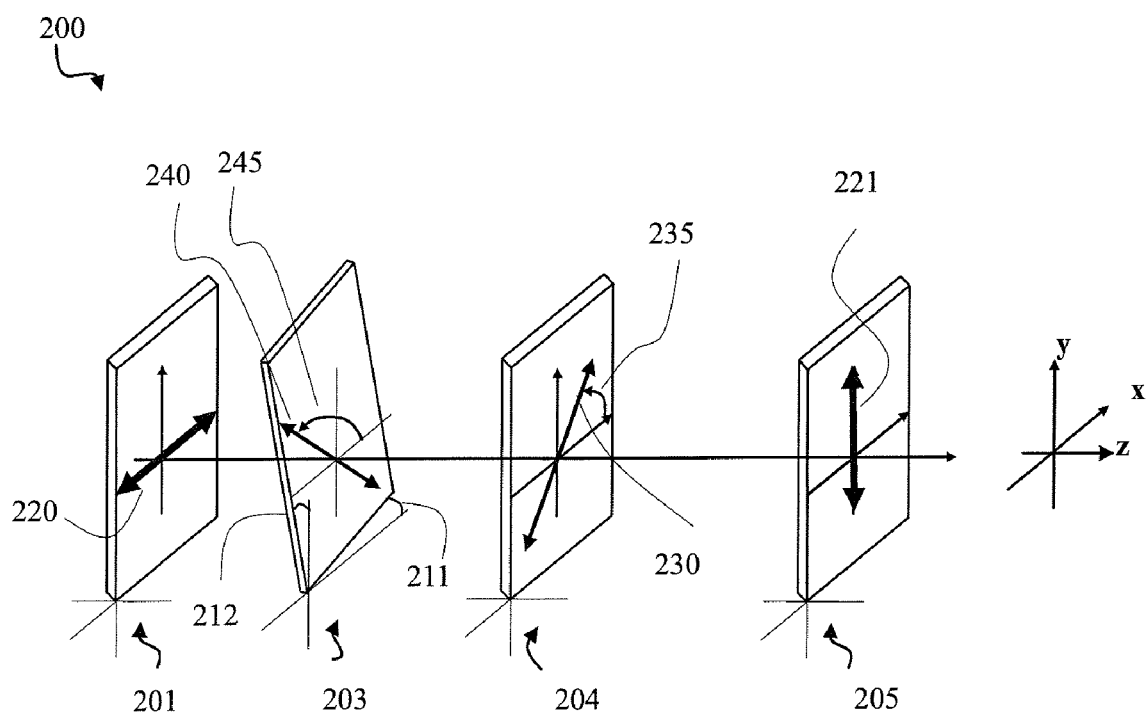
FIG. 2 is a schematic diagram of a transmissive microdisplay projection system including a tilted –C-plate for compensating for the display element retardance for on-axis and off-axis rays.
Figure 3:
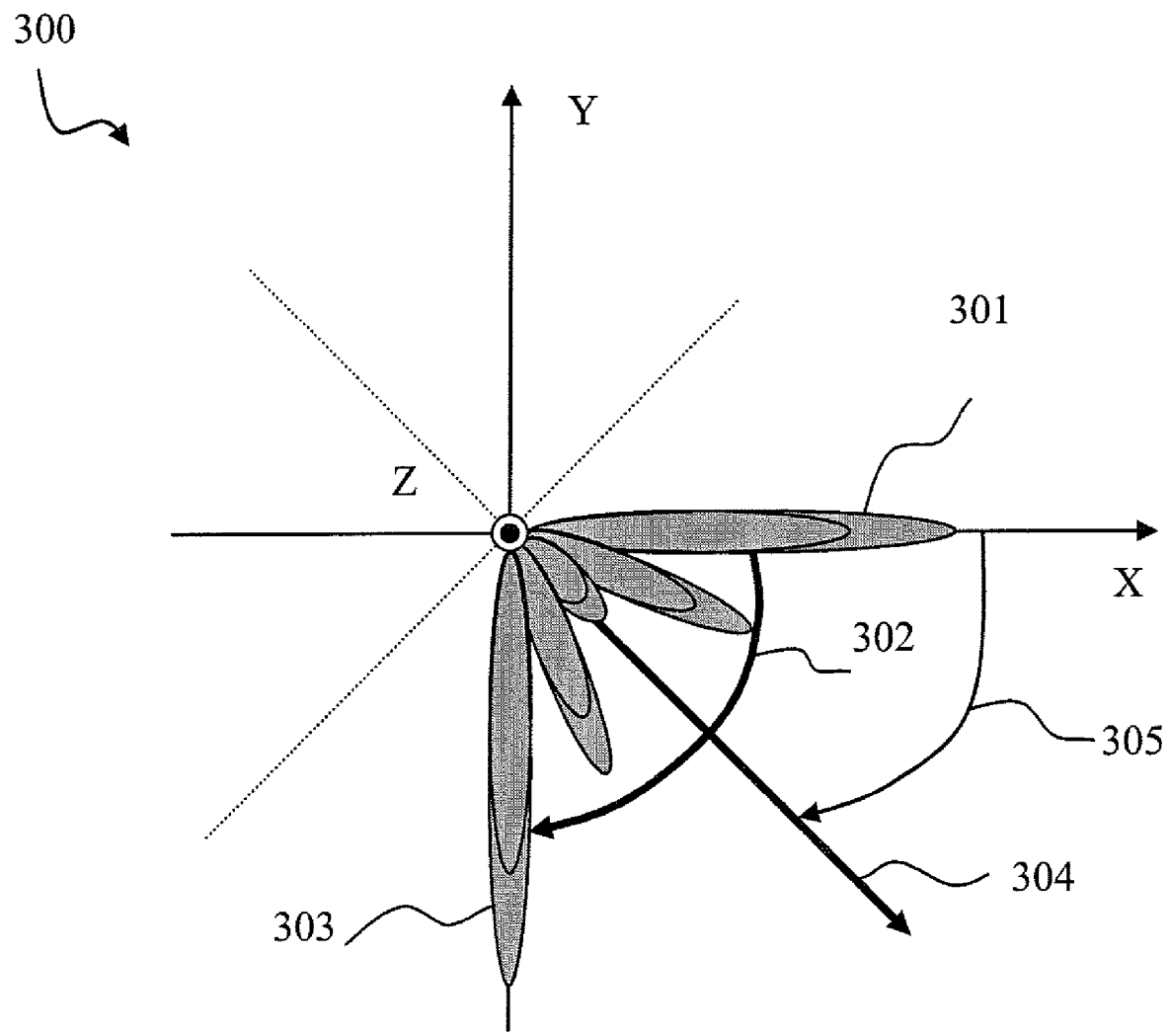
FIG. 3 is a schematic diagram of LC director distribution in a theoretical TN90 LC cell in the dark-state.

An example of a theoretical LC director distribution of the TN90 in the off-state is illustrated in FIG. 3. When viewing the TN90 from the exit or transmitted side, the entrance LC director azimuth 301 is aligned along the X-axis, whereas the exit LC director azimuth 303 is aligned parallel to the −Y axis. Between the entrance and the exit sections, the LC director continuously rotates along path 302, while varying the out-of-plane tilt through the LC cell thickness. Accordingly, the TN90 is said to have counter-clockwise (CCW) twist (as seen from the outer surfaces) or left-handed (LH) twist. Notably, the span of twist angles populates the fourth quadrant of a RH-XYZ view. The effective slow-axis (SA) of the TN90, at normal incidence, approximately bisects the span of twist angles. In FIG. 3, the SA is denoted as arrow 304 at azimuthal angle 305.

Figure 4:
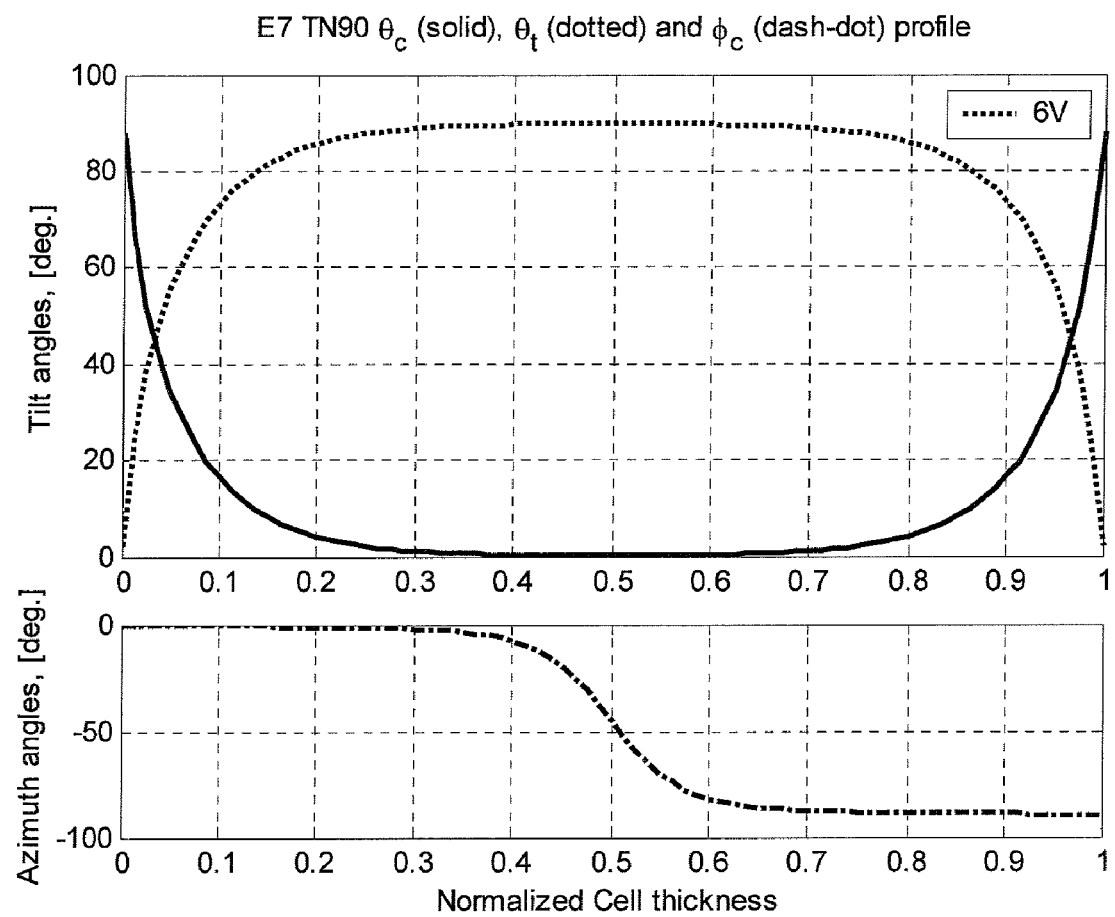
FIG. 4 shows the theoretical tilt/twist profiles of the TN90 LC cell driven to the dark state.

A one-dimensional (1D) numerical computation of the LC director distribution 300 is illustrated in FIG. 4. The cell is configured at the Mauguin condition (cell thickness d is given by $\sqrt{3}/2 \cdot \lambda_o/\Delta n$, where the center wavelength $\lambda_o$=550 nm and $\Delta n$=0.15 at $\lambda_o$) and the dielectric properties of E7 nematic LC are used in the energy minimization calculation. Referring to the top half of the drawing, which includes a plot of LC tilt angle $\theta_t$ versus fractional cell thickness, it is apparent that the mid-section of the cell is homeotropic (i.e., having a tilt angle of about 90°) when the cell is driven to the dark-state. The entrance segment quickly changes from a pre-tilt angle of 3 degrees to 90 degrees over a small cell fractional thickness. The tilt angle in the exit segment quickly changes from 90 degrees back to 3 degrees in a symmetric manner. Referring to the bottom half of the drawing, which is a plot of azimuthal angle $\phi_c$ versus fractional cell thickness, it is evident that most of the non-homeotropic aligned LC molecules are either anchored parallel to the X-axis or the −Y-axis. Accordingly, crossed-axes retardance cancellation occurs such that the residual LC cell retardance in the off-state is very small. While the residual LC cell retardance is minimal in theory, in practice the TN90 cell does not typically exhibit the symmetric alignment distribution discussed above. Accordingly, the residual net retardance of commercial TN90 imagers is appreciably higher (e.g., may be several nm to low tens of nm in value).

As discussed in US Pat. Appl. No. 20060268207, one method of compensating for the residual net retardance of a TN90 in the dark state is to use a single negative C-plate (NCP) mounted in a tilted configuration. In this instance (e.g., where the total twist angle is less than or equal to approximately 90 degrees), the NCP is tilted about an axis of rotation selected to be substantially orthogonal to the bisector of the TN twist angle range. The tilt angle of the NCP relative to the x-y plane determines the magnitude of the net retardance of the NCP, which is typically selected to be substantially equal to or larger than the residual retardance of the xLCD panel in the dark state. In general, the magnitude of the C-plate retardance and the size of the polar angle tilts should also adjusted such that the asymmetry of conoscopic net retardance maps of the tilted −C-plate retarder and the TN cell are well matched.

Figure 5:
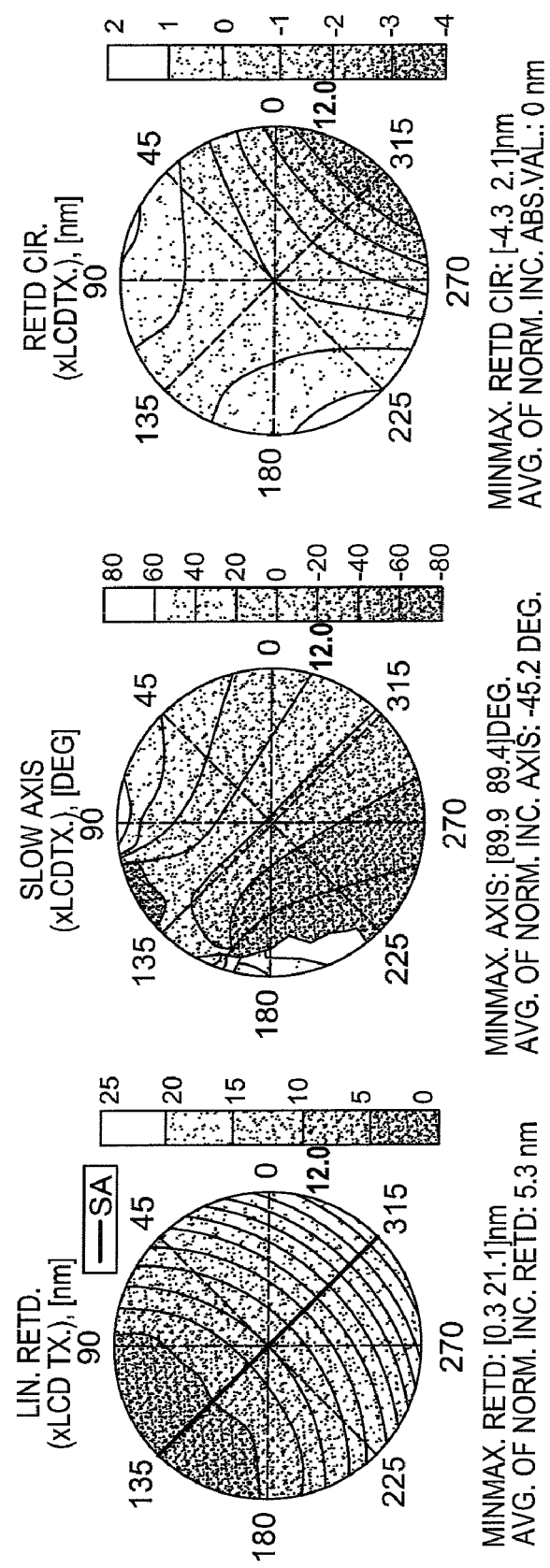
FIG. 5 shows calculated linear retardance (left), slow-axis (center), and circular retardance (right) conoscopic plots for the TN90 LC.
Figure 6:
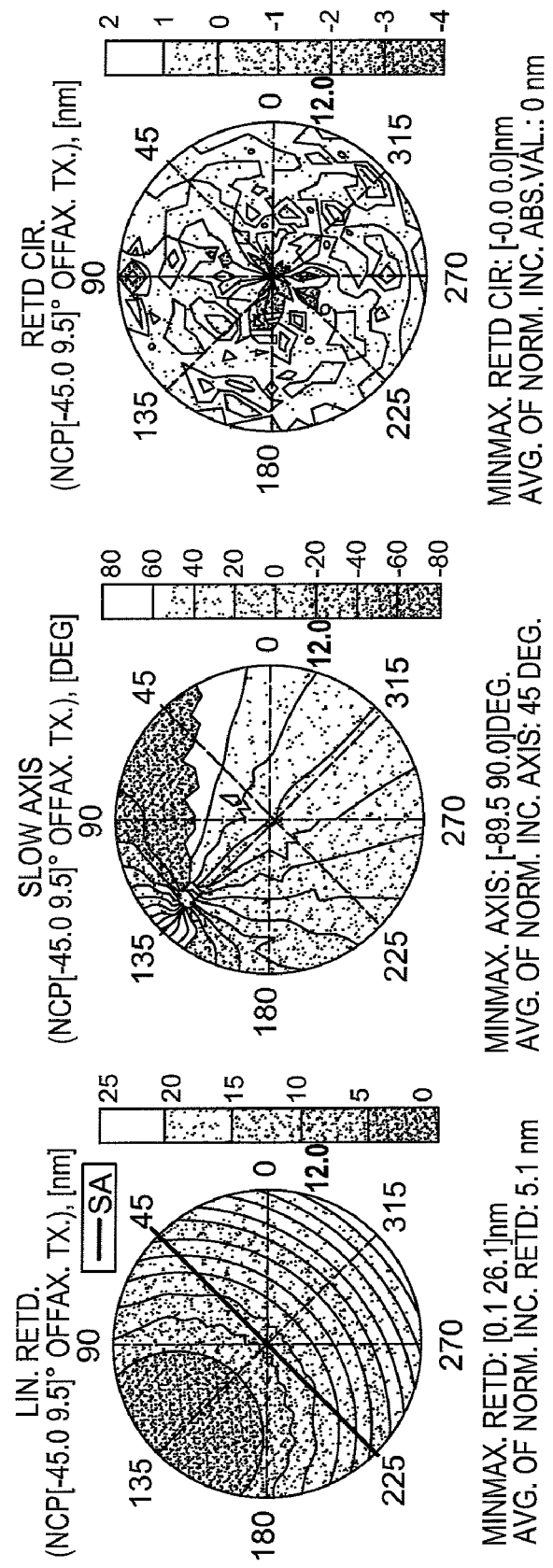
FIG. 6 shows calculated linear retardance (left), slow-axis (center), and circular retardance (right) conoscopic plots for a 450 nm C-plate retarder mounted at a 9.5 degree tilt angle (CCW about axis of rotation +45°)

Theoretical retardance triplet components of a TN90 xLCD and a tilted −450 nm C-plate retarder (at $\lambda_o$=550 nm) for a convergent f/2.4 (approximately ±12 degree) cone illumination are shown in FIGS. 5 and 6, respectively. More specifically, FIG. 5 illustrates the calculated linear retardance (left), slow-axis (center), and circular retardance (right) conoscopic plots for the LC director profiles illustrated in FIG. 4, while FIG. 6 illustrates the calculated linear retardance (left), slow-axis (center), and circular retardance (right) conoscopic plots for a −450 nm C-plate mounted at a 9.5 degree tilt angle (CCW about axis of rotation +45 degrees). Each conoscopic plot shows the retardance component from 0 to 12 degree polar angle of incidence over 360 degrees of azimuthal planes. Note that the abrupt changes of slow-axis at ±90 degree transition are artifacts of the plotting routine.

As illustrated in the linear retardance plots (left side of FIGS. 5 and 6), the SA of the TN xLCD panel and the SA of the retarder compensator are configured at orthogonal azimuthal orientation so that the role of the fast/slow axes can switch from the retarder compensator to the TN xLCD panel for normal incidence light. In other words, light having a specific polarization is alternately delayed more then less, or vice-versa, in the retarder compensator and the TN xLCD panel, respectively. Since the average retardation for normal incident light is approximately the same in the two components (e.g., 5.1-5.3 nm), the net effect is substantially zero relative delay for the incoming polarization. If the average retardation for normal incident light was larger in the retarder compensator, then the SA of the retarder compensator would typically be rotated (clocked) away from this crossed-axis configuration.

Figure 7:
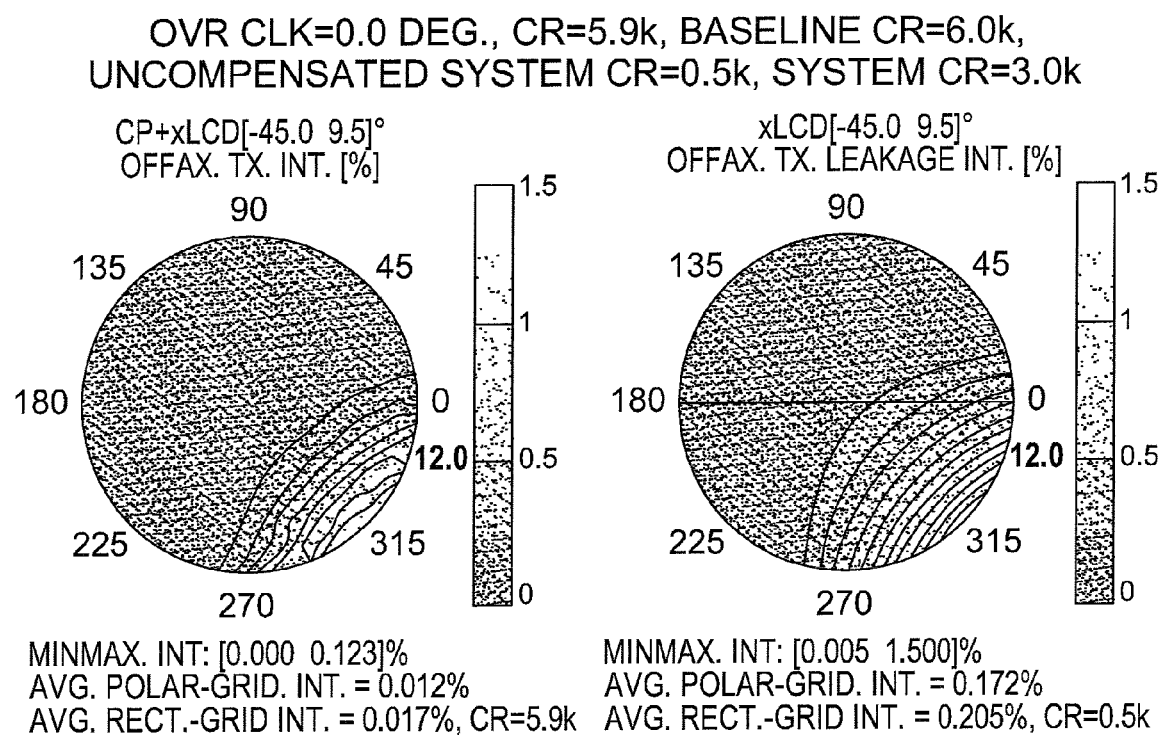
FIG. 7 shows the calculated contrast ratio contour plots for the TN90 xLCD (right) and for the compensated TN90 xLcD (left), wherein compensation is provided with the –450 nm C-plate retarder tilted at 9.5 degree along the –45 degree azimuth (CCW +45 degree axis of rotation)

The calculated contrast ratio versus viewing angle is illustrated in the crossed polarizer conoscopic leakage intensity profiles shown in FIG. 7. The contrast ratio contour plot for the uncompensated TN90 xLCD panel is shown on the right hand side, while the contrast ratio contour plot for the compensated TN90 xLCD panel is shown on the left (e.g., compensated with the −450 nm C-plate retarder inclined at 9.5 deg along the −45 degree azimuth (effected by CCW rotation about +45 degree axis of rotation)). The calculated two-stage xLCD/compensator raw contrast is 5,900:1. This is weighted down by the system baseline contrast (the limit of achievable contrast due to crossed polarizer leakage, etc.) of 6,000:1 to yield a 3,000:1 system contrast. The uncompensated TN90 xLCD contrast is computed to be 500:1. Hence, the contrast improvement factor is about 6×, by using an appropriate negative C-plate retarder as a compensator for TN xLCD.

Figure 8:
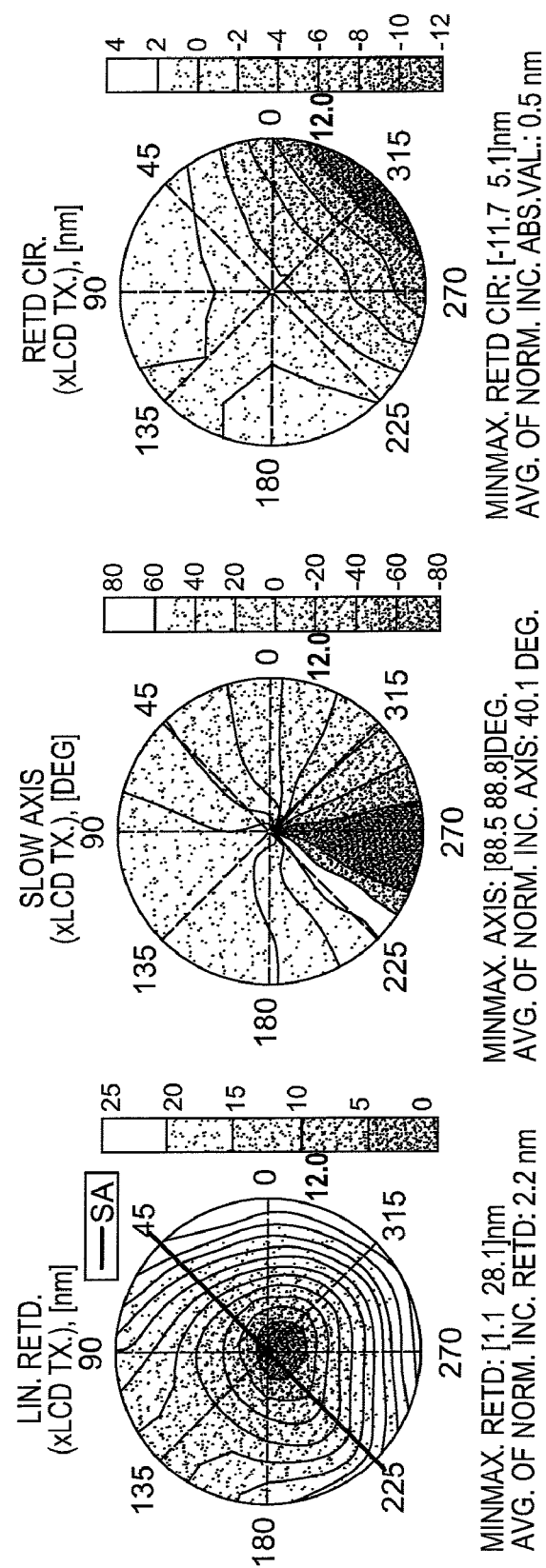
FIG. 8 shows the experimental linear retardance (left), slow-axis (center), and circular retardance (right) conoscopic plots of a TN90 xLCD driven to the dark-state, measured at 520 nm.

While this theoretical contrast improvement is acceptable, in is noted that the 1D LC director distribution model fails to fully describe the TN xLCD cells. In particular, the model fails to account for micro-structures on the TFT backplane, such as pedestals, grooves and lines, which are buried under the indium tin oxide (ITO) layers. These micro-structures, which are artifacts of the photolithographic exposure and etching processes, constrain the LC alignment in such a way that the 1D LC director profiling described above is inaccurate. For example, consider the experimental conoscopic retardance characteristics of a commercial TN90 xLCD panel (i.e., a left-shifted 1.3″ TN90 panel), which are depicted in FIG. 8. The measurements were obtained at a wavelength of 520 nm as the TN90 xLCD was driven to the dark-state. Surprisingly, the retardance SA at normal incidence (in-plane retardance) does not lie within the span of angles forming the twist range, which spans from 0 to −90 degrees. Instead, the xLCD SA lies in the adjacent quadrant, in between 0 and 90 degrees. The TN twist is illustrated to rotate from 0 degree in the input side to −90 degree in the output side, as evidenced by the sign and the fourth quadrant location of the conoscopic circular retardance. The main linear retardance asymmetry (i.e., retardance slope about cone axis) is also observed along the 135/−45 degree diagonal, indicating that this diagonal bisects the range of twist angles. The TN90 xLCD cell had an average of about 2.2 nm in-plane retardance and had its SA aligned at 40.1 degrees versus the X-axis (CCW positive angles in RH-XYZ coordinate system). Referring to the linear retardance plots (left), the "eye" (i.e., the low-retardance viewing angle where the incident ray propagates through the xLCD cell close to its optic axis) in the experimental data set is closer to the normal incidence point than the theoretical calculation predicted (e.g., FIG. 5). As a result, the on-axis retardance is further reduced.

Figure 9:
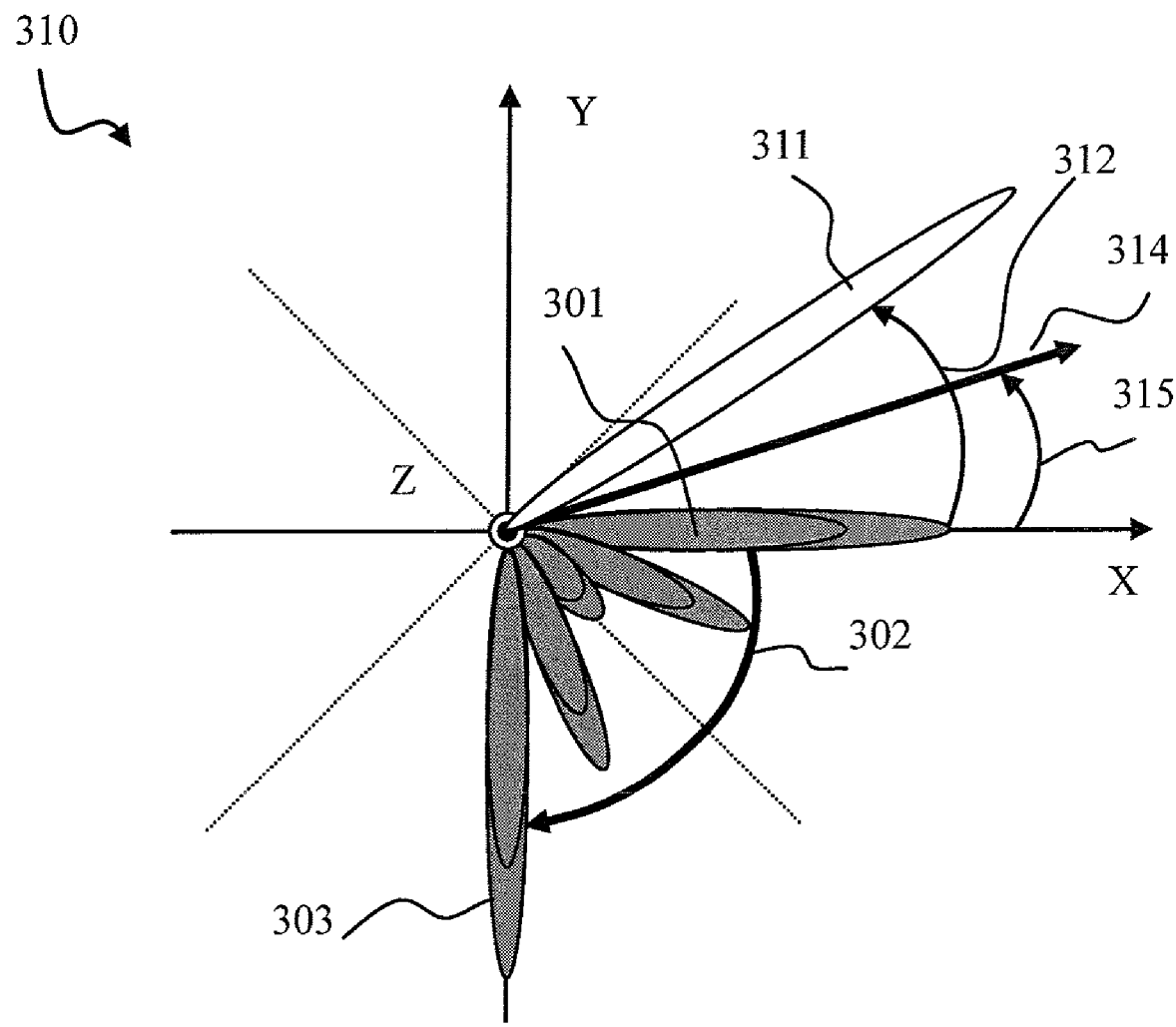
FIG. 9 is a schematic diagram of LC director distribution in a theoretical TN90 LC cell in the dark-state, using a two-part model.

A model 310 that produces conoscopic retardance profiles closer to experimental dark-state TN xLCD retardance results is shown in FIG. 9. This compound model includes a first retarder, similar to that discussed with regard to FIG. 3, and a second retarder, configured as an A-plate or an O-plate. When viewing the TN xLCD from the transmitted side, the entrance LC director azimuth 301 of the first retarder is aligned along the X-axis and the director continuously twists 302 towards the counter substrate while varying the out-of-plane tilt through the LC cell thickness. The exit LC director azimuth 303 of the first retarder is aligned parallel to the −Y axis. The result is a TN cell having a left-handed twist sense. The second retarder, which is configured as either an A-plate or an O-plate, is provided in order to numerically model an effective SA of the TN cell, at normal incidence, in the quadrant adjacent to the quadrant containing the span of twist angles. The second retarder is shown as retarder element 311 having a SA azimuthal angle 312. The net birefringence effects of the 90 degree TN cell with the additional A-plate/O-plate retarder element produce a SA 314 having an azimuthal angle 315 to the X-axis.

Figure 10:
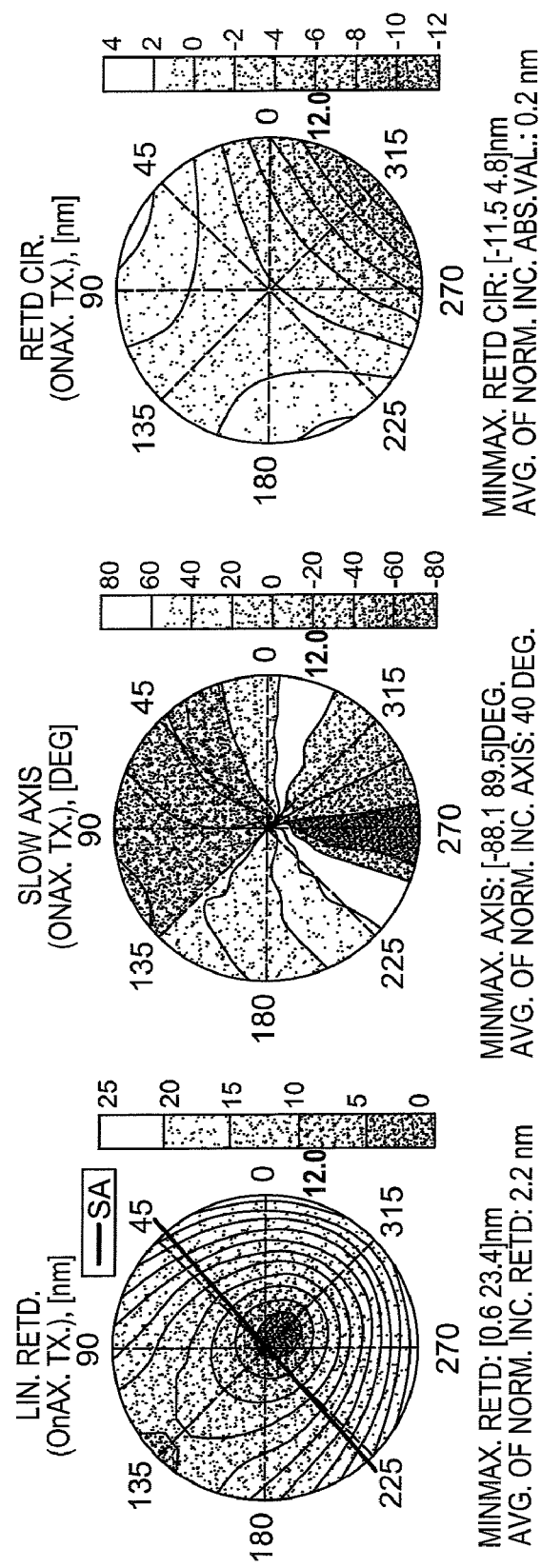
FIG. 10 shows the theoretical linear retardance (left), slow-axis (center), and circular retardance (right) conoscopic plots of the TN90 LC cell depicted in FIG. 9, calculated at 520 nm.
Figure 11:
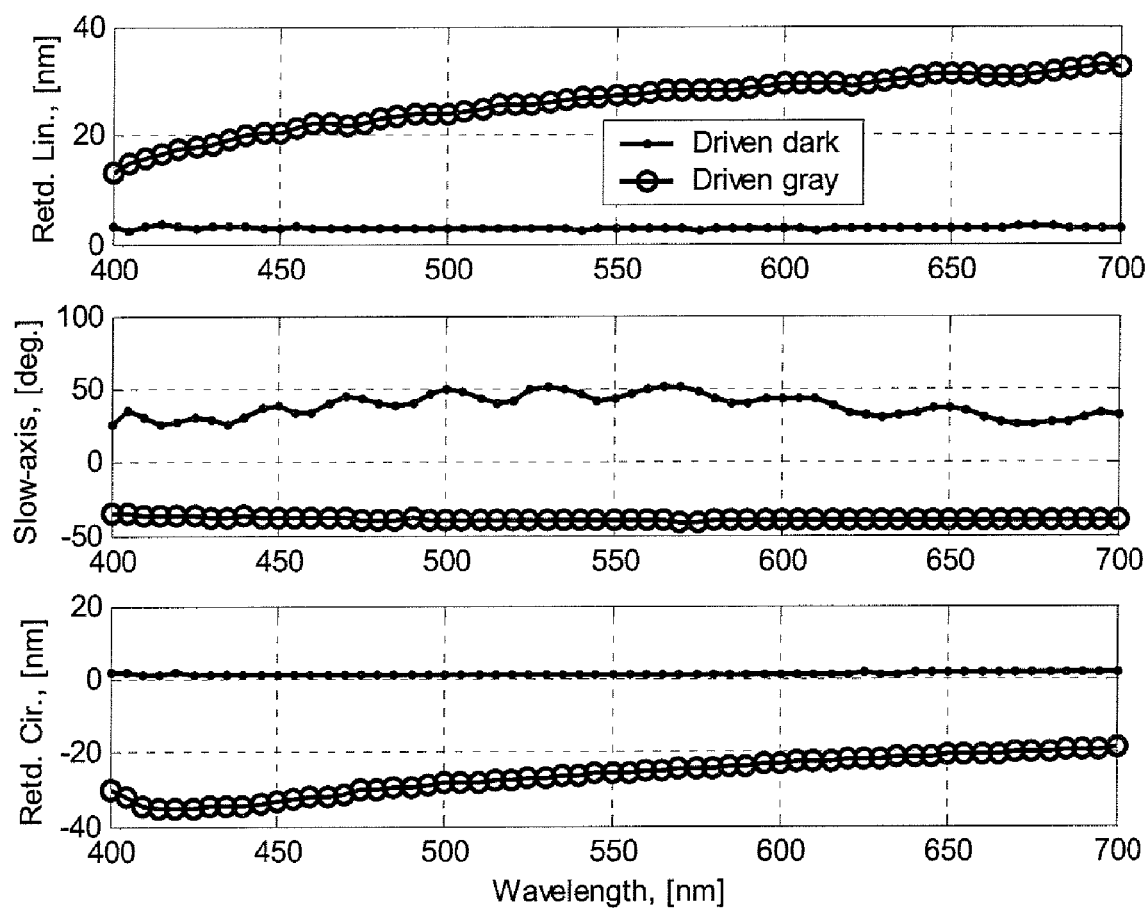
FIG. 11 shows the experimental linear retardance (top), slow axis (middle), and circular retardance (bottom) spectra of a TN90 xLCD cell at two drive voltages.

The conoscopic results of this numerical model of the TN90 xLCD are shown in FIG. 10. These plots show remarkable similarity to the experimental data shown in FIG. 8. The linear retardance plots (left) show a highly asymmetric profile along the 135°/−45° azimuthal plane (i.e., close to the fast axis (FA) plane). In addition, the low retardance "eye" is located close to the normal incidence point (notably, the modeled plot also includes another "eye" located approximately along the 135° azimuth). The circular retardance plots (right) of both experimental data and numerical results indicate a circular retardance that is negligible at normal incidence. At the cone edge of 12° AOI, the circular retardance reaches a maximum magnitude of approximately 12 nm along the −45° azimuth, within the quadrant containing the span of twist angles. The SA of both the experimental and the numerical TN device are aligned at about 40° CCW from the X-axis. It is expected that the effective TN cell SA retardance will gradually drift towards the fourth quadrant (within the span of twist angles) with increasing gray levels (e.g., with decreasing applied voltage). This is supported by the experimental slow axis spectra (middle) plotted for full-dark and gray level drive voltages of the TN90 xLCD, which are depicted in FIG. 11.

Figure 12:
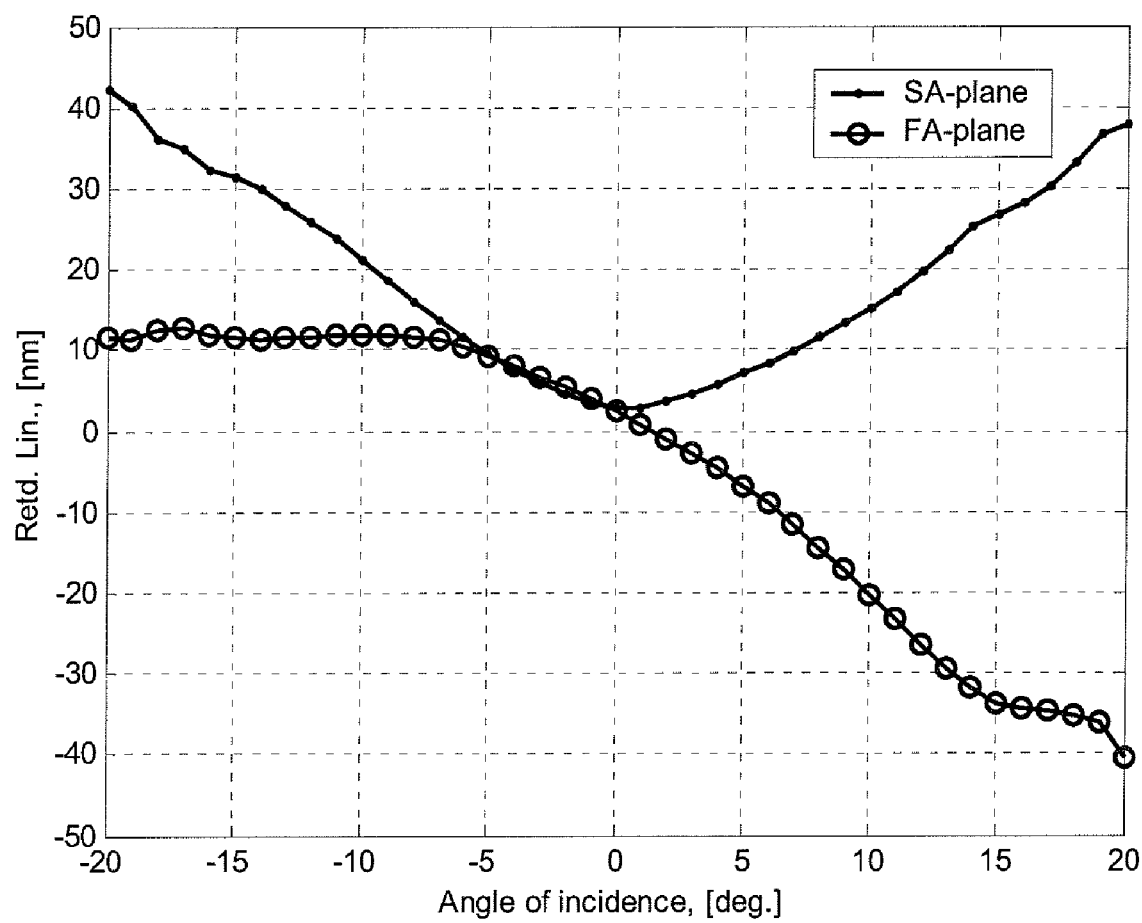
FIG. 12 shows experimental linear retardance profiles along the slow-axis (with dot markers) and fast-axis (with circle markers) planes of panel on-axis retardance at $\lambda=520$ nm.

Referring again to FIGS. 8 and 10, both the experimental panel and the numerical TN device model show a large asymmetry in the linear retardance profiles along the FA plane (about normal incidence). This asymmetry is clearly illustrated in FIG. 12, which shows the linear retardance profiles along the fast- and slow-axes for the experimental TN xLCD panel. In particular, FIG. 12 illustrates that the experimental linear retardance along the FA (e.g., for the line with the circle markers) rolls off from about 12 nm at θ=−12° to about −27 mm at θ=+12° for a wavelength of illumination at 520 nm. The negative retardation value signifies that the fast/slow axes have flipped.

Referring to FIG. 6, the tilted NCP also shows an asymmetry in the linear retardance profile along the FA plane. While this asymmetry complements the asymmetry along the SA plane in the 1D model (e.g., illustrated in FIG. 5), it is clear that it is not complementary to the large asymmetry along the FA plane in the compound model (e.g., illustrated in FIG. 10). Accordingly, it appears that the NCP is not ideal for compensating for the dark-state residual retardance of the experimental TN90 xLCD panel discussed with regard to FIG. 8.

In order to provide an improved retarder compensator for the TN90 xLCD it is necessary to look at the preferred characteristics of a retarder compensator. Ideally, retarder compensators should able to (a) compensate for the in-plane retardance of the panel, (b) reduce the out-of-plane +C-plate retardance of the panel, (c) match the linear retardance asymmetry of the panel retardance but with flipped axes (FA of panel versus SA of retarder and vice versa), and (d) reduce the circular retardance of the panel in off-state.

Conventionally, the first two requirements (a) and (b) have been addressed in a flexible manner by the independent control of A-plate and C-plate retardance, as for example, disclosed in U.S. Pat. No. 7,170,574. Since the A-plate and C-plate retardance are provided by different components, the first three requirements (a), (b) and (c) are relatively easy to meet. In US Pat. Appl. No. 20060268207, the first two requirements (a) and (b) were addressed with a −C-plate only retarder, which was tilted to provide compensation for both in-plane and out-of-plane retardance of the panel. While the tilted C-plate only retarder advantageously uses fewer components, the fact that the FA and the SA of the retarder compensator are set by the plane of incidence (e.g., is a geometric retarder as discussed above), can make it is more challenging to meet the third requirement. For example, in order to meet the third requirement (c) for the above-described experimental TN xLCD panel, the retarder compensator should exhibit a linear retardance along the SA plane that rolls off from about 12 nm at 0-12 degree to about −27 nm at θ=+12 degree at wavelength λ=520 nm. As described above, the −C-plate only retarder exhibits an asymmetry in the linear retardance profile along the FA plane. Accordingly, the C-plate only retarder is more suited for contrast compensation of transmissive panels where there is a natural match between the fast/slow axis orientations and the panel retardance asymmetry between the TPR and the xLCD and/or for contrast compensation of reflective panels where the asymmetry is equalized in the double-pass configuration, than for contrast compensation of the TN-mode xLCD described above.

In accordance with one embodiment of the instant invention, a retarder compensator fabricated from an A-plate or O-plate uniaxial retarder and one or more −C-plate retarders is used in a tilted configuration to provide retardance compensation for a TN xLCD panel. Advantageously, the combination of an A-plate element or O-plate element with one or more −C-plate elements provides a compound retarder that functions as a Cartesian retarder. The tilted −C-plate retarder allows for the matching of the panel linear retardance asymmetry, while the in-plane component of the tilted A-plate or O-plate retarder anchors the slow-axis of the retarder compensator at the required orientation.

Figure 13A:
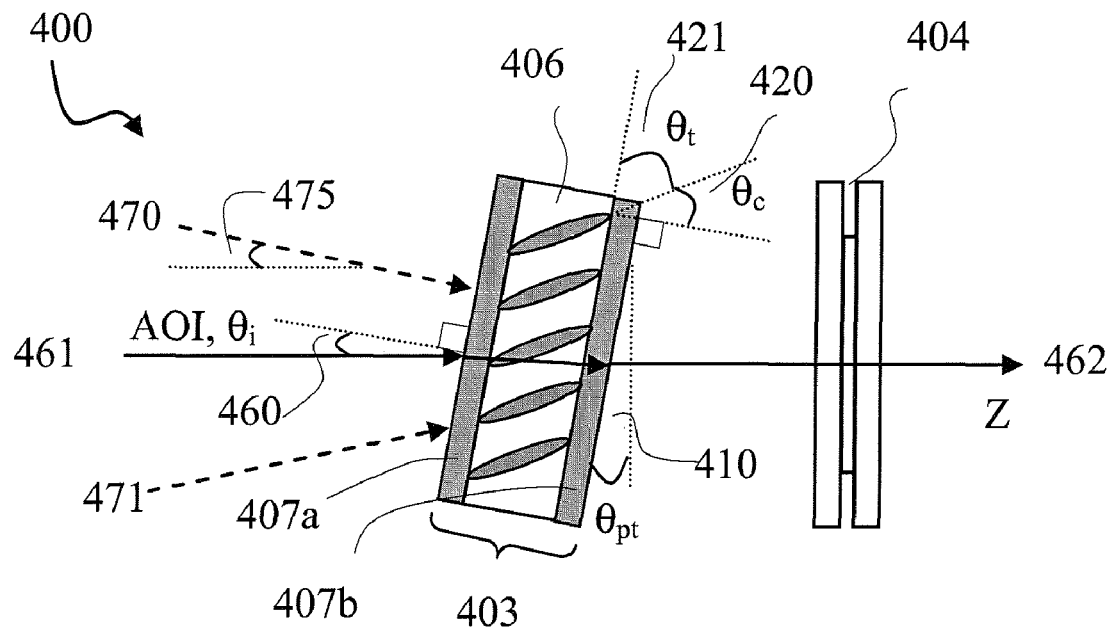
FIG. 13a is a schematic diagram of a retarder compensator in accordance with one embodiment of the instant invention disposed in front of a TN xLCD panel along a plane containing the fast-axis of the TN xLCD panel.

Referring to FIG. 13a, there is shown a schematic diagram of a retarder compensator in accordance with one embodiment of the instant invention. The retarder compensator is a compensating plate 403 shown in tandem with a TN xLCD panel 404, along a viewing plane containing the FA of the panel 404 at normal incidence (e.g., the FA of the panel is in the plane of the drawing). The compensating plate 403 includes an O-plate retarder 406, disposed between two negative C-plate retarders 407a, 407b. The combined retarder element 403 is tilted at an angle $\theta_{pt}$ 410 relative to the plane of the TN xLCD panel 404 to form what is referred to as a tilted-plate retarder (TPR)

The O-plate retarder 406 is a birefringent element having its optic axis (i.e., C-axis) oriented at an oblique angle with respect to the plane of the plate/layer. The optic axis of the O-plate retarder 406 is tilted at a polar angle $\theta_c$ 420 with respect to the retarder plate normal (e.g., as indicated by the index ellipsoid used to illustrate the index anisotropy). The term optic axis, as used herein, refers to the C-axis of a homogeneously tilted birefringent layer or the average C-axis of a continuously splayed birefringent layer. The corresponding out-of-plane tilt of index ellipsoid is given by $\theta_t$ 421, where $\theta_t + \theta_c = 90°$. When the O-plate retarder element 406 is configured as a positive uniaxial element, the optic axis is also the slow axis. The slow-axis azimuth of the O-plate retarder 406 is aligned along the tilt-plane (e.g., the plane containing full tilt angle $\theta_{pt}$, which also corresponds to the plane of the drawing in FIG. 13a). Some examples of materials suitable for fabricating the O-plate retarder 406 include liquid crystal polymer (LCP) material and positive uniaxial birefringent crystalline materials such as single-crystal quartz. Optionally, the O-plate retarder includes a supporting substrate.

Each of the –C-plate retarders 407a, 407b is a birefringent element having its optic axis oriented perpendicular to the plane of the plate/layer. While –C-plates do not generally provide any net retardation for normal-incident rays (i.e., normal incident light is unaffected by the birefringence), rays incident off-axis (i.e., at an angle to the optic axis) experience a net retardation in dependence to the incident angle. In particular, the net retardation decreases with angle of incidence (e.g., in contrast to a +C-plate where the net retardance increases with angle of incidence). The –C-plate elements 407a, 407b are coupled to the O-plate 406 such that their optic axes are oriented perpendicular to the plane of the O-plate birefringent element. Some examples of materials suitable for fabricating the –C-plates 407a, 407b include discotic liquid crystal and discotic birefringent polymer compounds. One particularly attractive method of fabricating the –C-plates 407a, 407b is to coat each side of the O-plate 406 with a form-birefringent anti-reflection (FBAR) coating. In an FBAR coating, the birefringence is provided by a plurality of thin-film layers formed from materials having alternating refractive indices, wherein the thickness of each of the thin-film layers is a fraction of the operating wavelength. The magnitude of the out-of-plane negative birefringence is determined by the thickness of the coating, the difference in refractive index between alternating layers, and/or the difference in thickness of alternating layers. Since the plurality of thin-film layers is typically formed from dielectric materials using one of various well known deposition techniques (e.g., sputtering or other vacuum deposition), the –C-plates are well suited for use in the high-light flux and/or temperature environments found in projection systems. FBAR coatings are discussed in further detail, for example, in U.S. Pat. No. 7,170,574.

Figure 13B:
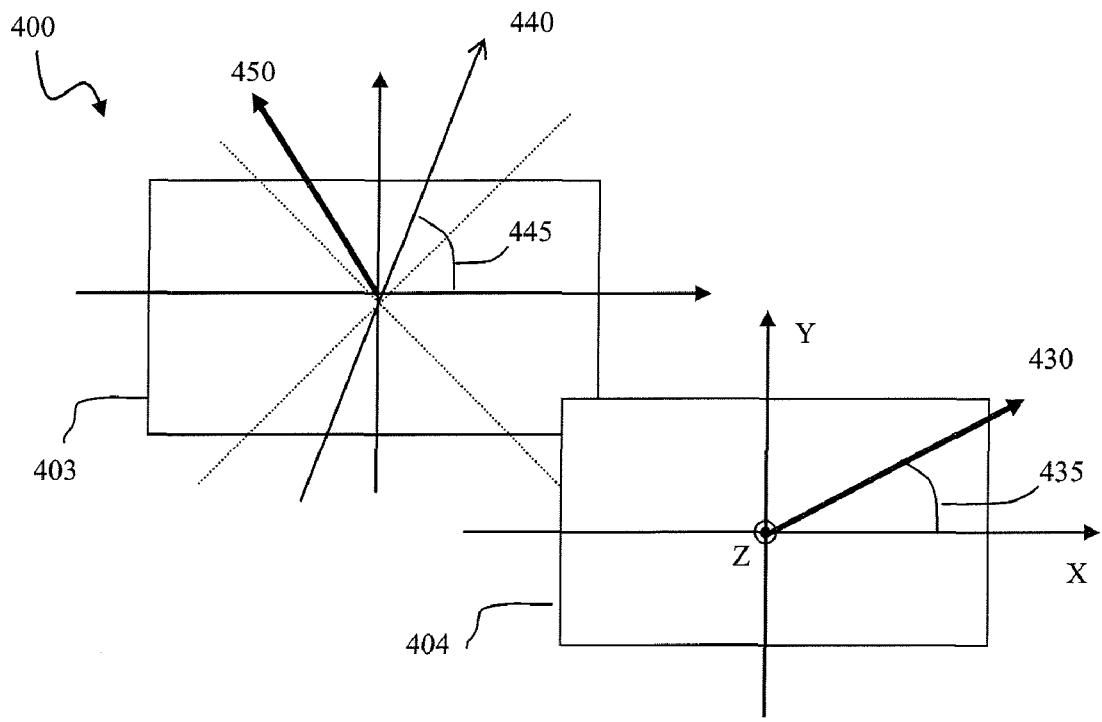
FIG. 13b is a 2D schematic diagram of the retarder compensator illustrated in FIG. 13a as viewed from the transmitted side.

Referring also to FIG. 13b, which is a schematic diagram showing a view of the sub-system 400 from the transmitted side, the retarder compensator 403 is tilted at angle $\theta_{pt}$ about an axis of rotation 440. The axis of rotation 440 is shown at an angle 445 (e.g., approximately 75°) with respect to the x-axis (e.g., versus the long side of the panel). This tilted geometry may be described using the notation ($\phi$, $\theta_{pt}$), where the first value $\phi$ describes the plate-tilt azimuthal angle (0 to 360° range) and the second value $\theta$ describes the plate-tilt polar angle (>0°). For example, if the plate tilt angle $\theta_{pt}$ is equal to 10° and the plate-tilt azimuthal angle is –15°, then this tilted geometry is defined as (~15°, 10°). Alternatively, this tilted geometry is defined by stating that the retarder compensator 403 is mounted at a 10 degree tilt angle along the –15° plate-tilt azimuthal plane. Since the axis of rotation about which the CCW plate rotation is effected is defined as plate-tilt azimuthal angle plus 90°, the plate-tilt azimuthal angle of –15° corresponds to an axis of rotation at 75°. In general, the axis of rotation 440 will lie in the adjacent quadrant to the viewing azimuthal plane where the TN panel exhibits the greatest amount of retardance slope through the normal incidence point (i.e., having a large linear retardance asymmetry). In the experimental TN retardance results shown in FIG. 8, this asymmetric plane corresponds to –45 degree azimuth. Hence, the nominal axis of rotation would be aligned at +45 degree, in such a manner that when the retarder is tilted, the retardance obtained from the TPR also shows a matching asymmetry to that of the panel along the –45 degree azimuth. The slow-axis of the TPR is aligned along this asymmetric plane, instead of the fast-axis as in the case of the TN panel.

Figure 13C:
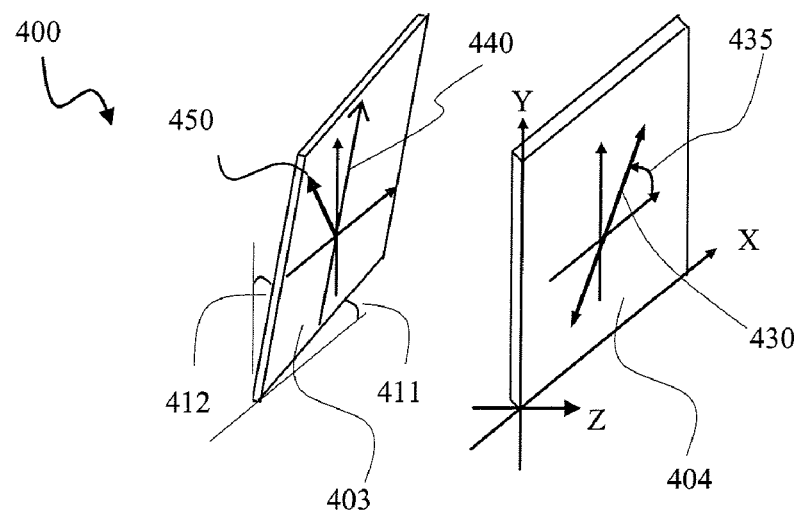
FIG. 13c is a 3D perspective view of the retarder compensator illustrated in FIG. 13a as viewed from the transmitted side.

As discussed above, the in-plane slow axis 450 orientation of the TPR 403 is aligned approximately perpendicular to the in-plane slow axis 430 of the TN90 xLCD panel 404 (e.g., azimuthally) when both the TPR and the TN90 xLCD panel have approximately the same retardance magnitude. In a more general case, the net retardance of the TPR element is made larger to account for the panel retardance tolerances and clocking is employed to optimize for contrast performance (i.e., the clocking axis is normal to the tilted plate). In this case, the axis of rotation and/or the slow-axis of the Cartesian retarder element may deviate from being orthogonal and parallel to the plate-tilt azimuthal plane, respectively. For example, as illustrated in FIG. 13b, the axis of rotation 440 is approximately aligned at 75 degree CCW from X-axis whereas the Cartesian retarder has a slow-axis 450 aligned at approximately 110 degree CCW from X-axis. For an O-plate Cartesian retarder element, the slow-axis refers to the azimuthal plane having an acute polar angle of the optic axis with respect to the +Z-axis. A 3D perspective view of the general alignment of the axis of rotation and Cartesian retarder slow-axis is depicted in FIG. 13c. Note that after the plate tilting, the axis of rotation remains parallel to the panel x-y plane. The Cartesian retarder is aligned at a polar angle tilt 411 versus the system X-axis and at a polar angle tilt 412 versus the system Y-axis.

Referring again to FIG. 13a, the SA of the TPR 403 is determined by the SA 450 of the tilted O-plate retarder 406 and the SA of the tilted –C-plate retarders 407a, 407b. Note that when the compensator plate is tilted, the slow-axis orientation of the –C-plate component is aligned parallel to the axis of rotation (e.g., having an angle 445). Therefore, for a TPR having two –C-plate elements on either side of an O-plate element, the light ray at the cone center experiences a resultant effect of having a first slow-axis aligned at 440 orientation, a second slow-axis aligned at 450 orientation and a third slow-axis aligned at 440 orientation. In general, the O-plate retarder 406 will yield a larger positive retardation effect at the small plate-tilt angle than the negative retardation effect of the –C-plate retarders 407a, 407b at the same plate-tilt angle. Accordingly, when the O-plate SA orientation is oriented approximately along the plate-tilt azimuthal plane and the relative retardation magnitudes of the O-plate is greater than those of –C-plate retarders, the cone center ray sees an effective SA of the TPR that is approximately oriented along the plate-tilt azimuth even though the negative C-plate retarder reduces the retardation effect of the O-plate.

In operation, the TN xLCD panel 404 is disposed such that the center ray 461 of an incident cone of light having extrema 470 and 471 and subtending a half-cone angle $\theta_h$ 475 is at normal incidence. The tilted-plate retarder (TPR) 403 is disposed such that the center ray 461 of the cone illumination strikes the −C-plate 407a with an angle-of-incidence (AOI) $\theta_i$ 460 determined by the plate tilt angle $\theta_{pt}$ 410. After a slight lateral translation, the cone center ray 461 exits both the TPR 403 and the TN xLCD 404 as ray 462.

Convergent rays in the upper half (e.g., 470) of the cone see a compensator retardation that is larger than the normal incident ray (e.g., larger net retardance from the O-plate). In addition, convergent rays in the upper half (e.g., 470) of the cone also see a panel net retardation (including retardation sign) that is larger than the normal incidence ray (e.g., arising from the in-plane and out-of-plane retardance of the panel). To demonstrate that, in fact, all rays within the 1D cone illumination are well compensated, the retarder compensator 403 has been approximated with a single-layer uniaxial O-plate retarder and a single-layer uniaxial −C-plate retarder (e.g., with the same −C-plate retardance exhibited by the two −C-plate retarders 407a, 407b) to calculate the compensation efficiency.

Table 1 shows the calculated in-plane retardance and C-plate retardance for a retarder compensator having a single-layer uniaxial O-plate retarder coupled with a −C-plate retarder, which is tilted and configured with a SA-plane retardance profile to match the FA-plane retardance profile of a TN xLCD. The wavelength of simulation is 520 nm. The refractive indices $\{n_o, n_e\}$ for the O-plate at $\lambda$=520 nm are $\{1.502, 1.655\}$, whereas the refractive indices $\{n_o, n_e\}$ for the −C-plate at $\lambda$=520 nm are $\{1.655, 1.502\}$.

Figure 14:
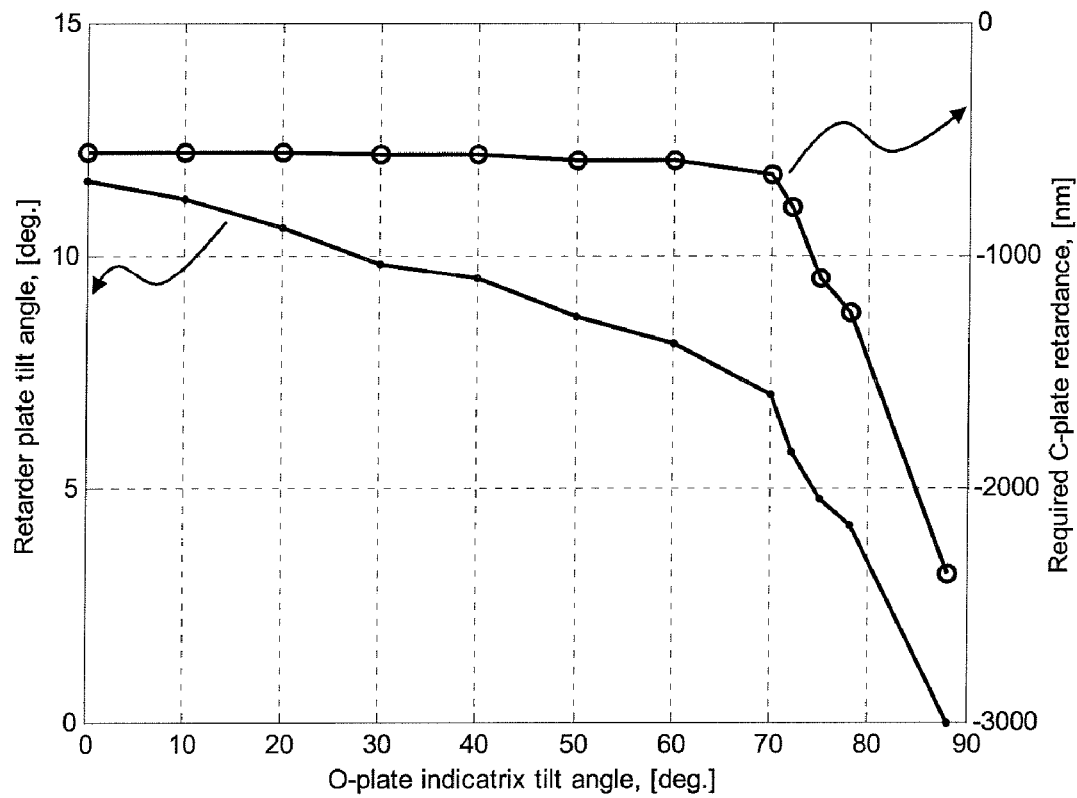
FIG. 14 shows plots of calculated retarder plate tilt angle and required C-plate retardance versus O-plate indicatrix tilt angle.

According to Table 1, both the required plate-tilt angle $\theta_{pt}$ and the required C-plate retardance vary as a function of the out-of-plane tilt angle $\theta_t$ of the O-plate indicatrix. A plot of these parameters is shown in FIG. 14. It is clear that the C-plate retardance requirement becomes asymptotically large at O-plate indicatrix tilt angles $\theta_t$ above 75°. At O-plate indicatrix tilt angles $\theta_t$ smaller than 70° the C-plate retardance does not vary much, but the required plate-tilt angle $\theta_{pt}$ continues to increase with decreasing O-plate indicatrix tilt angle $\theta_t$. Accordingly, in order to accommodate the trade-off between the plate-tilt angle $\theta_{pt}$ and the C-plate retardance, and in order to produce a slow-axis plane linear retardance profile that is matched to the FA plane linear retardance profile of the TN xLCD panel, the O-plate indicatrix tilt angle $\theta_t$ will typically be between 30° to 75°, and more likely between 50° to 70°.

TABLE 1

Retarder and plate-tilt parameters of a single-layer uniaxial positive O-plate retarder coupled to a —C-plate retarder whose SA-plane retardance profile matches the FA-plane TN xLCD retardance profile.

| O-plate indicatrix tilt, $\theta_t$, [deg.] | Plate-tilt, $\theta_{pt}$, [deg.] | In-plane retardance, [nm] | C-plate retardance, [nm] |
|---|---|---|---|
| 0 | 11.6 | 12.6 | −558 |
| 10 | 11.2 | 12.7 | −557 |
| 20 | 10.6 | 12.7 | −558 |
| 30 | 9.8 | 11.7 | −567 |
| 40 | 9.5 | 13 | −567 |
| 50 | 8.7 | 13.4 | −592 |
| 60 | 8.1 | 13.9 | −593 |
| 70 | 7.0 | 13.6 | −650 |
| 72 | 5.8 | 12.7 | −788 |
| 75 | 4.8 | 9.4 | −1100 |
| 78 | 4.2 | 8.9 | −1250 |
| 88 | 0 | 2.5 | −2350 |

As an example calculation of the contrast efficiency, a retarder compensator having a single-layer uniaxial O-plate retarder coupled with a −C-plate retarder, and tilted at approximately 10.3° along −45° azimuthal plane (or CCW rotation about axis of rotation at +45° azimuth) has been modeled. This tilted plate geometry is referred as (−45°, 10.3°) where the first value describes the plate-tilt azimuthal angle (0 to 360° range) and the second value describes the plate-tilt polar angle (>0°). The plate-tilt azimuth (PTA) at −45° is approximately orthogonal to the SA plane (e.g., +40.1°) of the TN xLCD panel. The single-layer O-plate has its index indicatrix aligned at 50° out-of-plane tilt, yielding an in-plane retardance of 12.6 nm. The −C-plate has a retardance of −525 nm at $\lambda$=520 nm. Note that the in-plane retardance of 12.6 nm and the plate tilt of 10.3° differ from the corresponding values calculated in Table 1 for the out-of-plane tilt of 50° because this model uses an O-plate having refractive indices $\{n_o, n_e\}$ of $\{1.598, 1.670\}$ (e.g., corresponding to a proprietary Liquid Crystal Polymer (LCP)). The negative C-plate, which in one embodiment is formed from one or more dielectric form-birefringent AR stacks, has been approximated with an equivalent C-plate retarder having indices of $\{1.655, 1.502\}$.

Figure 15:
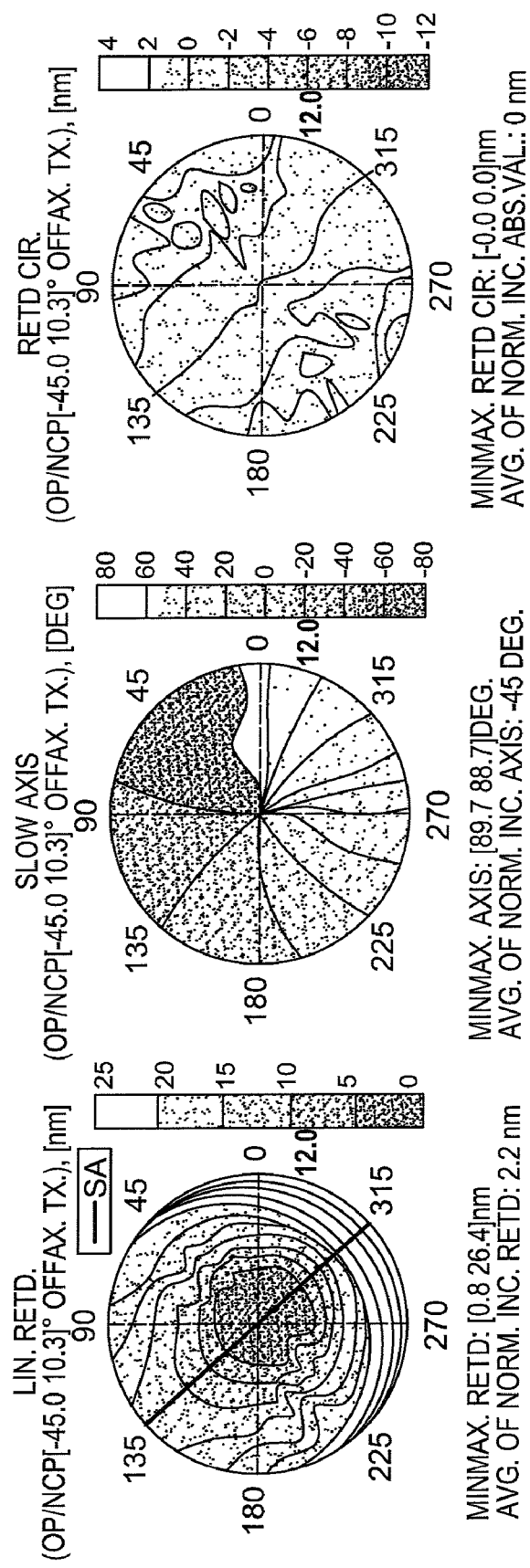
FIG. 15 shows the theoretical linear retardance (left), slow-axis (center), and circular retardance (right) conoscopic plots of a (–45°, 10.3°) tilted O-plate/–C-plate retarder compensator, wherein the O-plate is configured at 50° out-of-plane tilt using positive uniaxial material and the –C-plate has –525 nm retardance (wavelength of calculation $\pi=520$ nm)

The conoscopic retardance components of the single-layer uniaxial O-plate retarder coupled with the −C-plate retarder are shown in FIG. 15 for an approximately f/2.4 cone illumination at $\lambda$=520 nm. The left plot shows the linear retardance conoscopic profile; it has a linear retardance distribution similar to the experimental TN xLCD panel (e.g., see FIG. 8) except that the slow-axis as seen by the cone center ray is approximately orthogonal to the panel slow-axis (e.g., −45° for TPR versus +40.1° for TN90 xLCD panel). Note that the tilted plane was selected to be −45° in this calculation example to impose an approximate crossed axes configuration with respect to the slow axis of the panel, as required by the matched retardance magnitudes of the TPR and the experimental TN xLCD panel (e.g., both ~2.2 nm retardance for the cone center ray). The center plot in FIG. 15 shows the slow-axis distribution of the TPR. It has an approximate 90° offset relative to the slow-axis distribution of the experimental TN xLCD shown in FIG. 8 (e.g., average of −45° relative to an average of 40.1°). As expected from a single-layer O-plate birefringent structure, there is negligible circular retardance component for the single-pass transmission. This is illustrated in the plot on the right side of FIG. 15.

Figure 16:
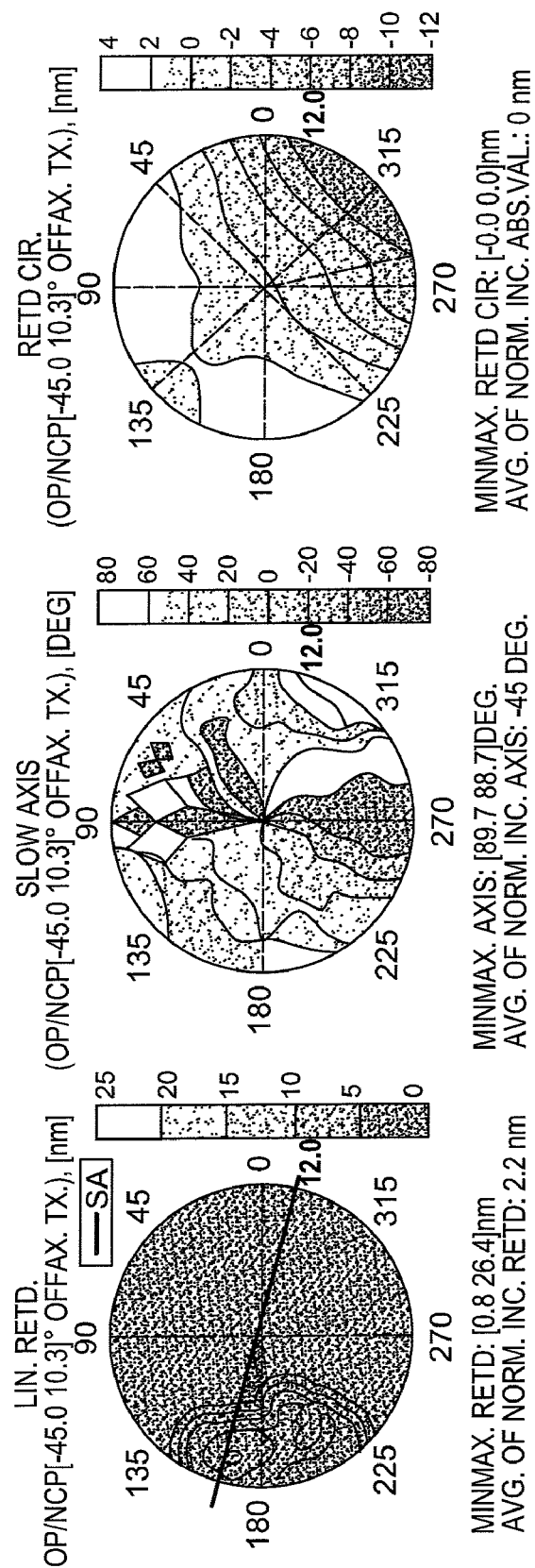
FIG. 16 shows the theoretical linear retardance (left), slow-axis (center), and circular retardance (right) conoscopic plots of a system including a (–45°, 10.3°) tilted O-plate/–C-plate retarder compensator and an experimental TN xLCD panel.
Figure 17:
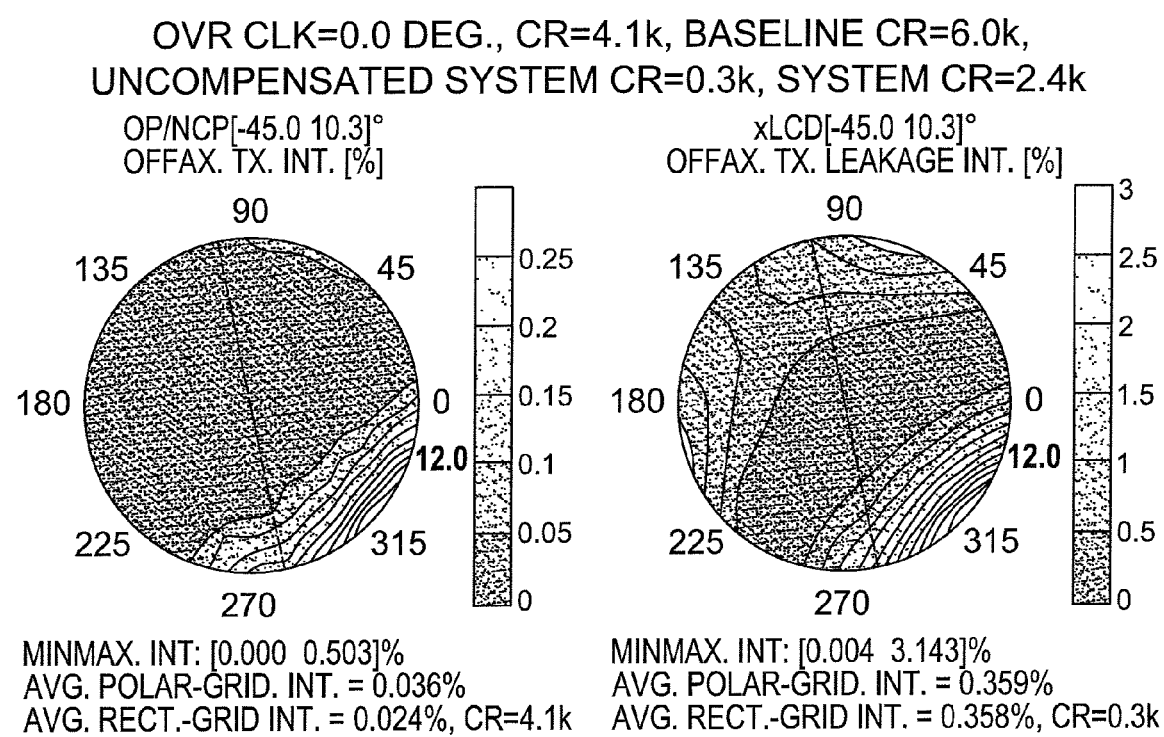
FIG. 17 shows the calculated conoscopic crossed polarizer leakage intensity of an experimental TN90 xLCD (right) and the same TN90 xLCD compensated with a (–45°, 10.3°) tilted O-plate/–C-plate retarder (left) oriented in an approximately crossed axes configuration.

A two-stage system calculation, including the TPR and the experimental TN xLCD panel data, yields net conoscopic retardance components shown in FIG. 16. The left, center, and right plots of this figure represent the linear retardance, slow-axis and circular retardance distribution versus an f/2.4 convergent cone. The shaded gray scales on all three plots are similar to the corresponding scales used in the experimental TN xLCD panel data (e.g., FIG. 8) and TPR data (e.g., FIG. 15). According to the linear retardance plot (left) the residual linear retardance of the experimental TN xLCD panel is well compensated by the linear retardance of the TPR. In fact, the two-stage system shows ~0 nm net retardance at all cone illumination angles, except areas around 180° cone azimuth. The slow-axis distribution of the two-stage system is not critical as the net linear retardance is close to 0 nm. The net circular retardance of the two-stage system has approximately the same profile as the experimental TN xLCD panel because the TPR does not yield circular retardance. The circular retardance in the TN xLCD panel ultimately limits the maximum achievable contrast using the modeled TPR as a contrast compensator. In this contrast calculation example, the experimental TN xLCD panel has been modeled to have a 300:1 contrast at λ=520 nm, whereas the same panel that is compensated with the TPR yields a contrast of 4,100:1. It is noted that this compensated contrast is weighted down by the optical system baseline contrast (e.g., due to crossed polarizer leakage, etc.). The expected system contrast ratio is 2,400:1 with a realistic system baseline contrast of 6,000:1. The crossed polarizer leakage conoscopic profiles are shown in FIG. 17. The left-hand plot shows the compensated panel leakage intensity results, with 1/10 of the shaded-gray scale of the panel-only leakage intensity in the right-hand plot. In the compensated panel leakage plot, the cone edge viewing angles around the 4th quadrant have the most severe leakage, which is a manifestation of the remaining uncompensated circular retardance in the panel. Similarly, the panel-only leakage profile also has the most severe leakage around the cone edge in the 4th quadrant, due to the combined effects of residual linear and circular retardance.

With the contrast calculation example above, the contrast compensation efficacy of the TPR paired with an experimental TN xLCD panel has been illustrated. In commercial light engine applications, both the TN xLCD and the TPR parameters will have a uniformity distribution. In particular, the panel off-state retardance and axis orientation vary from panel to panel and also with temperature drifts, mechanical mounting stress, etc. The TPR has distributions of the O-plate tilt angle, in-plane retardance, and C-plate retardance magnitude. It's expected that the actively switched TN xLCD will have a larger retardance variance (e.g., as large as ±30%) than the passive O-plate retarder (e.g., up to ±5% retardance variance). A practical TPR design, intended to cover the entire production variance of both the panel and TPR involves boosting the in-plane retardance of the O-plate and using one or combinations of adjusting the polar angle tilt of the TPR, revolving the TPR about the optical system Z-axis, rotating (e.g., clocking) the TPR about its device normal along the tilt plane, and non-mechanical means of voltage/temperature control of the TN xLCD such that the dark-stage panel retardance and/or slow/fast axes can be matched to the requirements of a given TPR.

Figure 18:
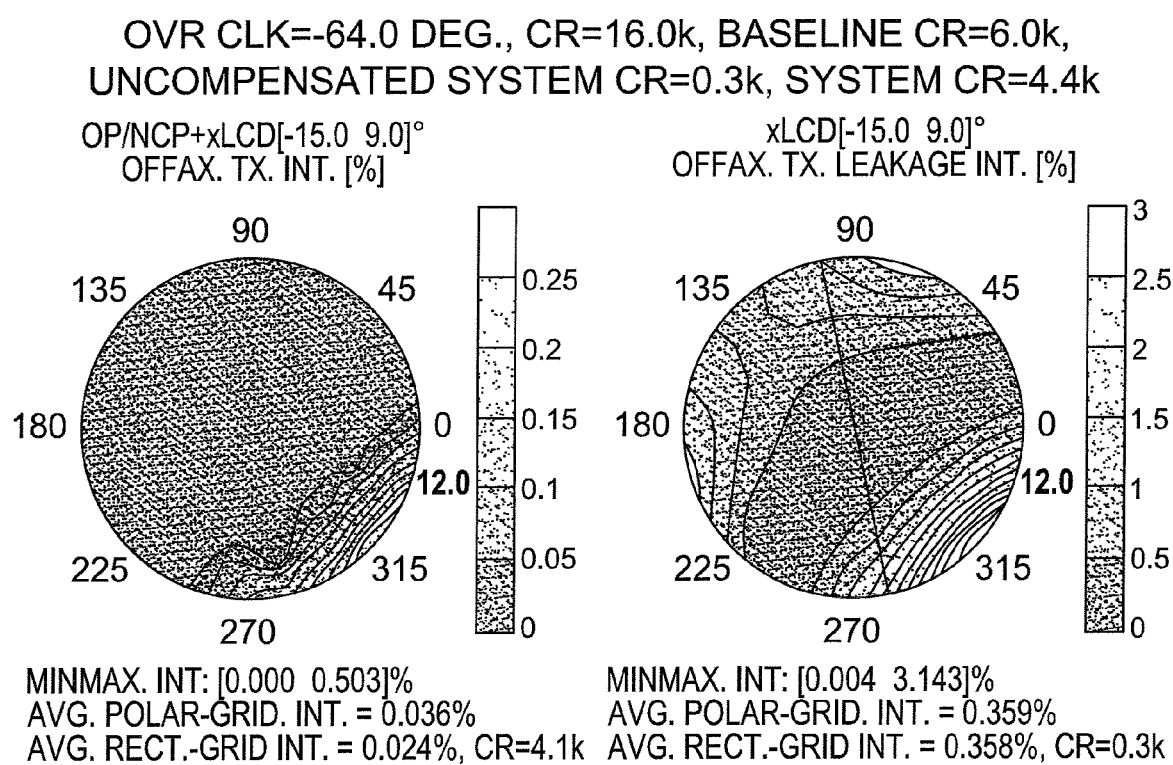
FIG. 18 shows the calculated conoscopic crossed polarizer leakage intensity of an experimental TN90 xLCD (right) and the same TN90 xLcD compensated with a (~15°, 9.0°) tilted O-plate/–C-plate retarder (left) oriented in a non-crossed axes configuration.
Figure 19:
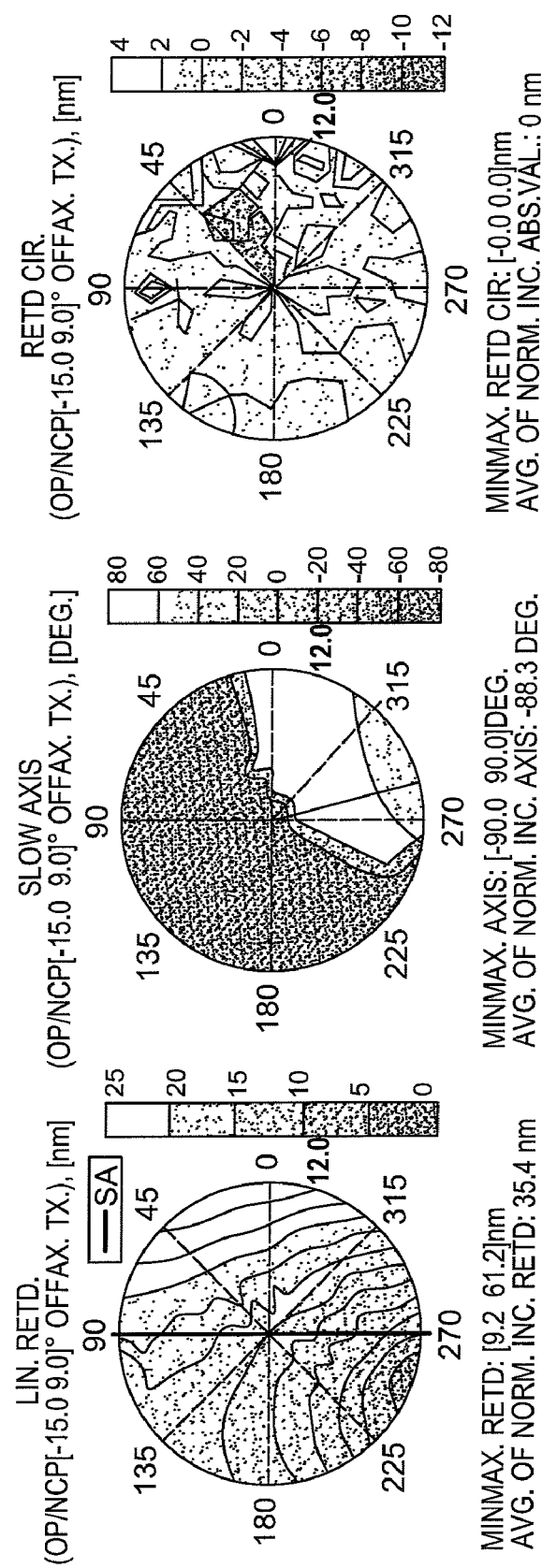
FIG. 19 shows the theoretical linear retardance (left), slow-axis (center), and circular retardance (right) conoscopic plots of a (–15°, 9.0°) tilted O-plate/C-plate retarder compensator, wherein the O-plate is configured at 50° out-of-plane tilt using positive uniaxial material and the C-plate has –525 nm retardance (wavelength of calculation $\lambda=520$ nm)
Figure 20:
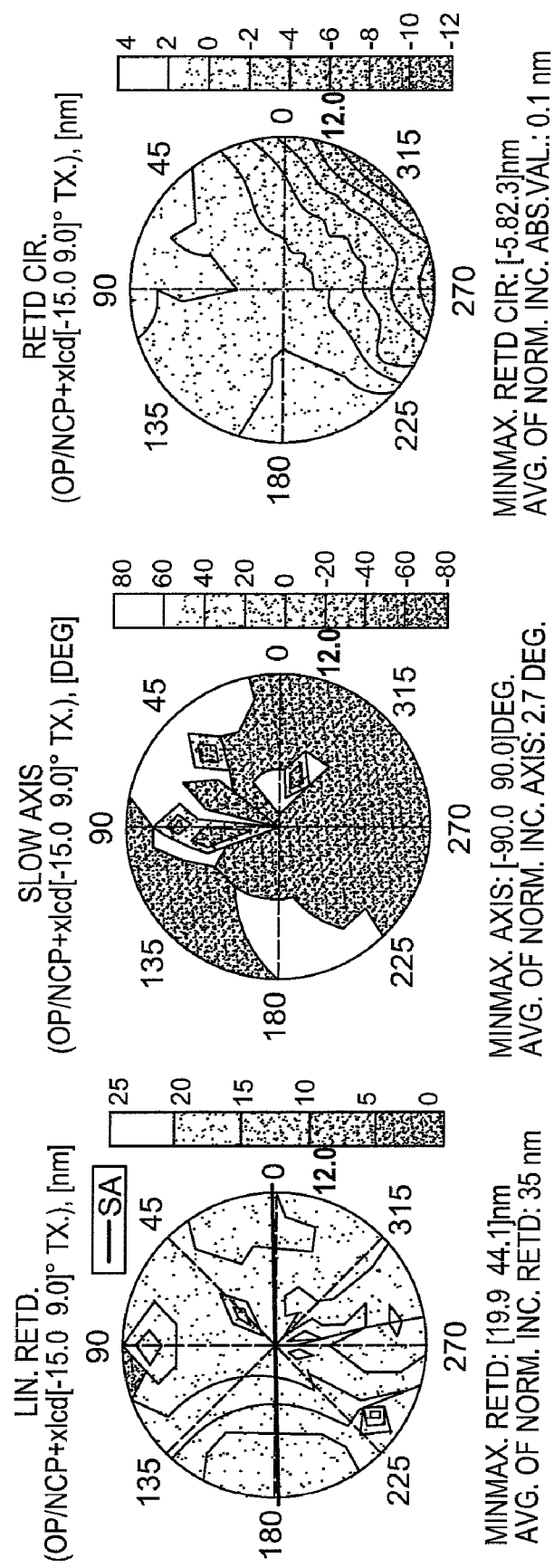
FIG. 20 shows the theoretical linear retardance (left), slow-axis (center), and circular retardance (right) conoscopic plots of a system including a (–15°, 9.0°) tilted O-plate/C-plate retarder compensator and an experimental TN xLCD panel.

As an illustration of the production-capable TPR design, an O-plate retarder having an indicatrix tilt of 50° and 32.0 nm in-plane retardance is coupled to a negative C-plate retarder of −525 nm (both retardances referenced to λ=520 nm). The combined retarder is tilted at 9° polar angle along −15° plate-tilt azimuthal angle. In this case, the raw compensated contrast is 16,000:1 as shown in FIG. 18, which is nearly four times that of the approximately crossed axes compensation solution shown in FIG. 17. The shaded-gray scales shown in the left and right-hand plots in FIG. 18 are the same as those in FIG. 17. The conoscopic retardance components of the 32 nm TPR, tilted at 9° along −15° azimuthal plane are shown in FIG. 19 with respect to the coordinates of an f/2.4 cone. The slow-axis of the O-plate retarder has been 'clocked' by −64.0° (CW rotation about the plate normal after the out-of-plane tilting and away from being contained in the plate-tilt azimuth). Although the conoscopic TPR linear retardance does not resemble the TN xLCD linear retardance profile, the retardance profile as well as its slow-axis distribution (mostly near ±90° as shown in the center plot) meet the over-clocking requirements. The combination of the TPR retardance characteristics with the experimental TN xLCD retardance yields the two-stage retardance properties shown in FIG. 20. It can be seen that the net linear retardance of the paired devices does not approach 0 nm, but their combined linear retardance effects result in a birefringent axis aligned nearly parallel/orthogonal to the crossed polarizers for all cone angles. In addition to compensating for the linear retardance in the TN xLCD panel, this TPR also reduces the panel circular retardance. This is shown by the reduced circular retardance in the right plot versus the circular retardance of the experimental TN xLCD (e.g., on axis 0.1 nm versus 0.5 nm in panel, and circular retardance span −5.8~2.3 nm versus-11.5~5.1 nm in the panel).

The structure of the tilted-plate retarder does not yield any circular retardance due to the homogeneous slow-axis azimuthal angles across the O-plate thickness. However, when the TPR is used to compensate for TN xLCD panel retardance, the TPR retardance as seen by the cone rays in combination with the panel retardance, form an inhomogeneous retarder cascade. The normal incidence of the panel yields approximately +0.5 nm of circular retardance. The combination of the TPR and the panel linear retardance must also yield a negative circular retardance in order to reduce the residual +0.5 nm panel circular retardance. To obtain a negative circular retardance, a cascade of two or more retarder elements should have the slow-axis orientations twisting through clockwise from the input to the output direction (left-hand twist with the thumb pointing at the direction of light propagation and the fingers pointing at the sense of slow-axis evolution). In this example, the TPR has its slow-axis aligned at approximately −88.2° (also 91.8°), whereas the panel has its slow-axis aligned at approximately +40.1°. The induced circular retardance is negative in sign and the normal incidence circular retardance of the two-stage system is reduced. Similarly, all other cone rays have the appropriate handedness in forming the inhomogeneous retarder cascade and both the most positive and most negative panel circular retardance within the f/2.4 cone are partially compensated. Hence, the application of a tilted-plate retarder which itself does not contain circular retardance provides a means for reducing the panel circular retardance, in accordance to the compensation requirement (d) above.

Figure 21:
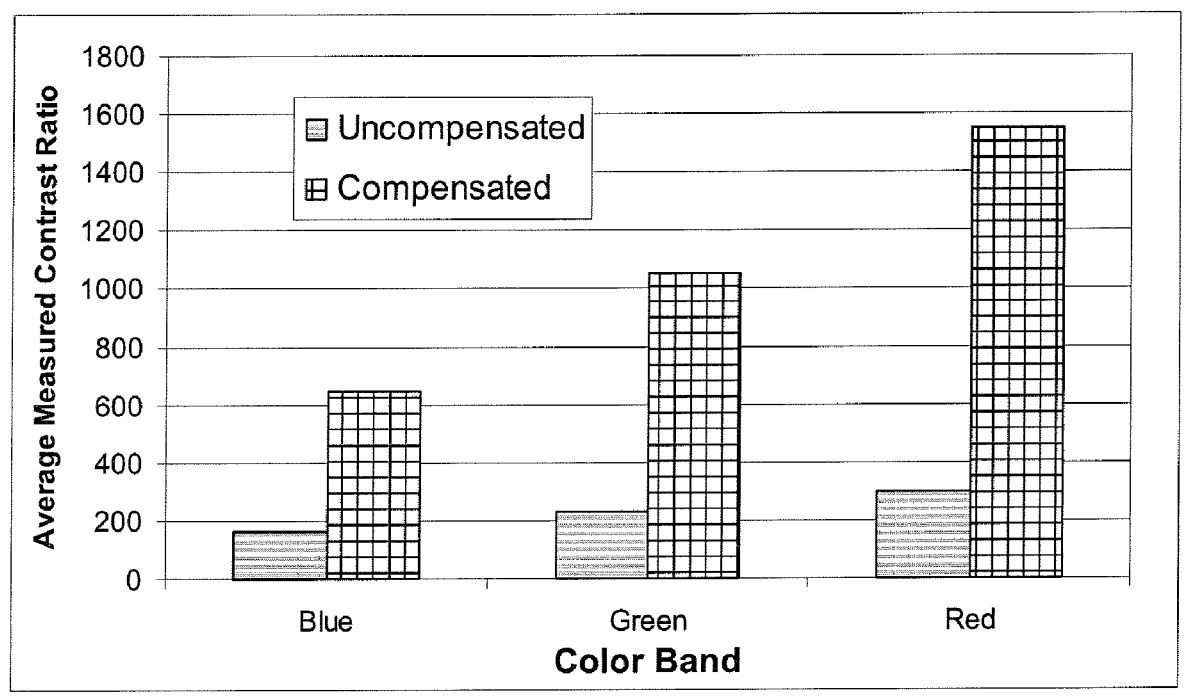
FIG. 21 shows experimentally measured contrast ratios of uncompensated TN90 panels and the same panels compensated with a titled plate retarder in accordance with one embodiment of the present invention.

Several retarder compensators have been fabricated. The retarder assembly utilizes a monolithic integration of LCP Cartesian O-plate retarder and FBAR −C-plate elements. The retarder was aligned at a predetermined tilt angle, about a predetermined axis of rotation. The contrast optimization was accomplished with clocking (i.e., rotating) the retarder assembly about its plate normal axis. The panel on- and off-state luminance values were collected with a spectral resolving detector system and weighted by the photopic response function. The contrast results are shown in FIG. 21. In the green channel, the TPR has improved the panel contrast from approximately 230:1 to approximately 1050:1. The gain factor is greater than 4 times. Clearly, the retarder compensator, designed according to one embodiment of the present invention and applied to a projector system incorporating a TN panel, provides for significant contrast enhancement.

One thing to consider when using the TPR is the wavelength dispersion of the negative C-plate retarder. While the O-plate retarder is often configured using birefringent materials (e.g., LCP) having a material index dispersion similar to the LC found in the TN xLCD panel, the −C-plate retarder is often formed from one or more FBAR coatings. As discussed above, FBAR coatings are typically fabricated from a plurality of alternating low and high index dielectric thin layers. To provide for a large effective form-birefringence, the index contrast (ratio of high to low indices) is generally quite high. For example, the FBAR coating(s) are often formed from alternating layers of tantala and silica. A high index material such as tantala is more dispersive than the LC material in the LCD panel. Accordingly, the FBAR coating(s) used in the TPRs are optionally designed to reduce the C-plate retardance dispersion.

As a calculation example, four different FBAR stack designs were modeled. The first FBAR design included the repeat segment 30 nmH/45 mL, the second FBAR design included the repeat segment 20 nmH/30 mL, the third FBAR design included the repeat segment 15 nmH/23 mL, and the fourth FBAR design included the repeat segment 10 nmH/15 mL. In each case, 'H' refers to a tantala high index layer and 'L' refers to a silica low index layer. Each of the four stacks targeted a C-plate retardance of −340 nm at λ=520 nm and a reflectance of less than 0.1% within 460–580 nm. In each case, the ratio of H/L layer thickness was approximately the same, whereas the combined thickness of the alternating H/L layers varied.

Figure 22:
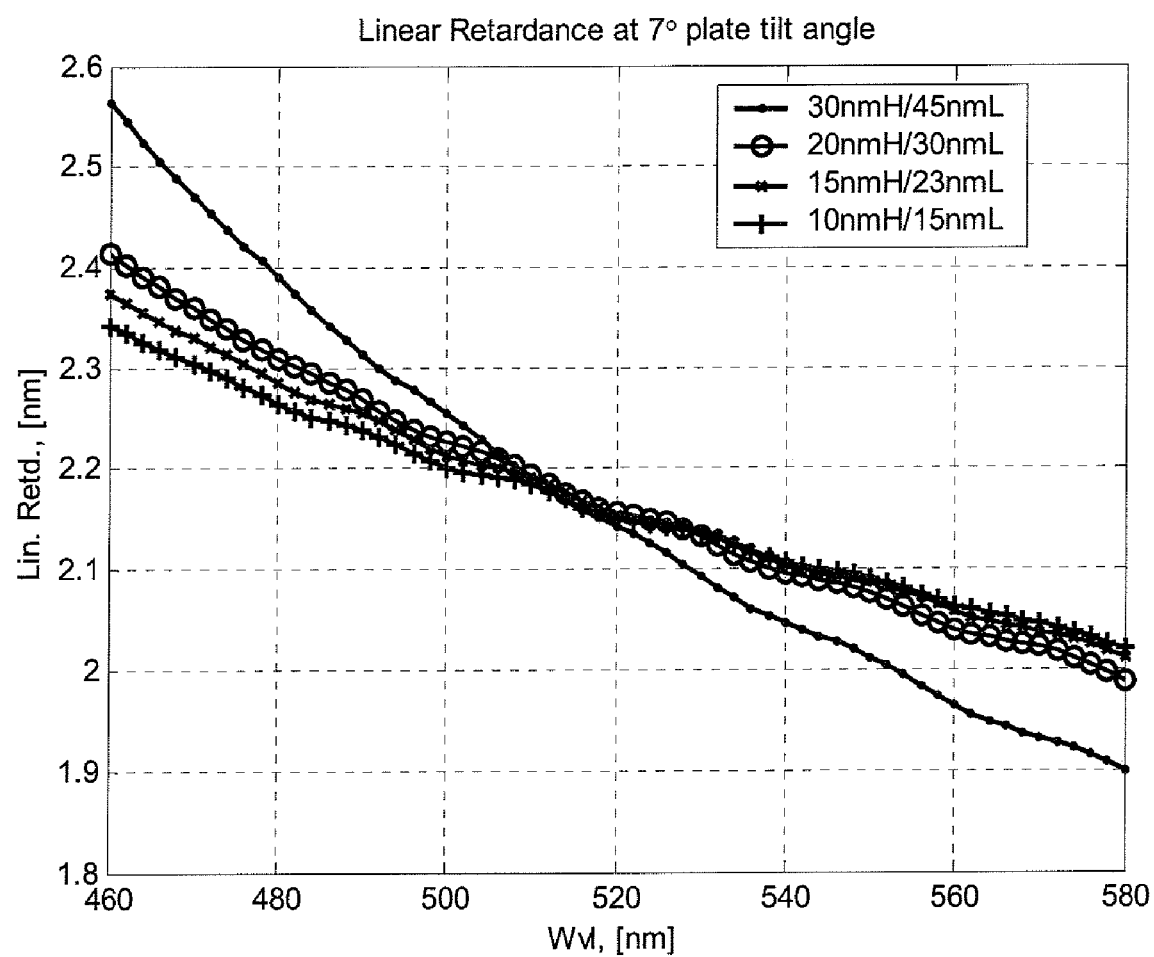
FIG. 22 shows the calculated linear retardance spectra of four dielectric C-plate stacks, including AR functionality, at plate tilt angle of 7°.

The calculated retardance spectra at a 7° plate-tilt angle (also angle of incidence of the cone center ray) are shown in FIG. 22. The best dispersion performance of the four FBAR stacks comes from the thinnest repeat layers (e.g., the fourth FBAR design). The theory of form-birefringence is based on the quasi-static situation where both 'H' and 'L' layer thicknesses approach 0 nm. Hence, a repeat segment formed with appreciable 'H' and 'L' layers will be more dispersive than form-birefringence theory suggests. In the example given, the most dispersive "thick" repeat pair yields +19.5/−11.3% deviation of retardance at the short and long wavelength edges versus the nominal retardance value at λ=520 nm. On the other hand, the least dispersive "thin" repeat pair yields +8.9%/−6.0% retardance deviation at the corresponding wavelength points. In practice, there will be a trade-off between what is manufacturable for a given vacuum deposition process and the best contrast compensation over the required wavelength band.

In addition to selecting the appropriate combined thickness of the alternating H/L layers, the ratio of the 'H' to 'L' layer thicknesses will also influence the C-plate retardance dispersion. For example, if a 50 nm paired thickness is the thinnest combined layer thickness for good manufacturing tolerance, there are still several variants of design which can minimize the retardance dispersion.

As a calculation example, an additional five different FBAR stack designs were modeled. The fifth FBAR design included the repeat segment 10 nmH/40 nmL, the sixth FBAR design included the repeat segment 20 nmH/30 mL, the seventh FBAR design included the repeat segment 25 nmH/25 mL, the eighth FBAR design included the repeat segment 30 nmH/20 mL, and the ninth FBAR design included the repeat segment 40 nmH/10 mL. In each case, 'H' refers to a tantala high index layer and 'L' refers to a silica low index layer. Each of these five stacks targeted a nominal −340 nm C-plate retardance at λ=520 nm.

Figure 23:
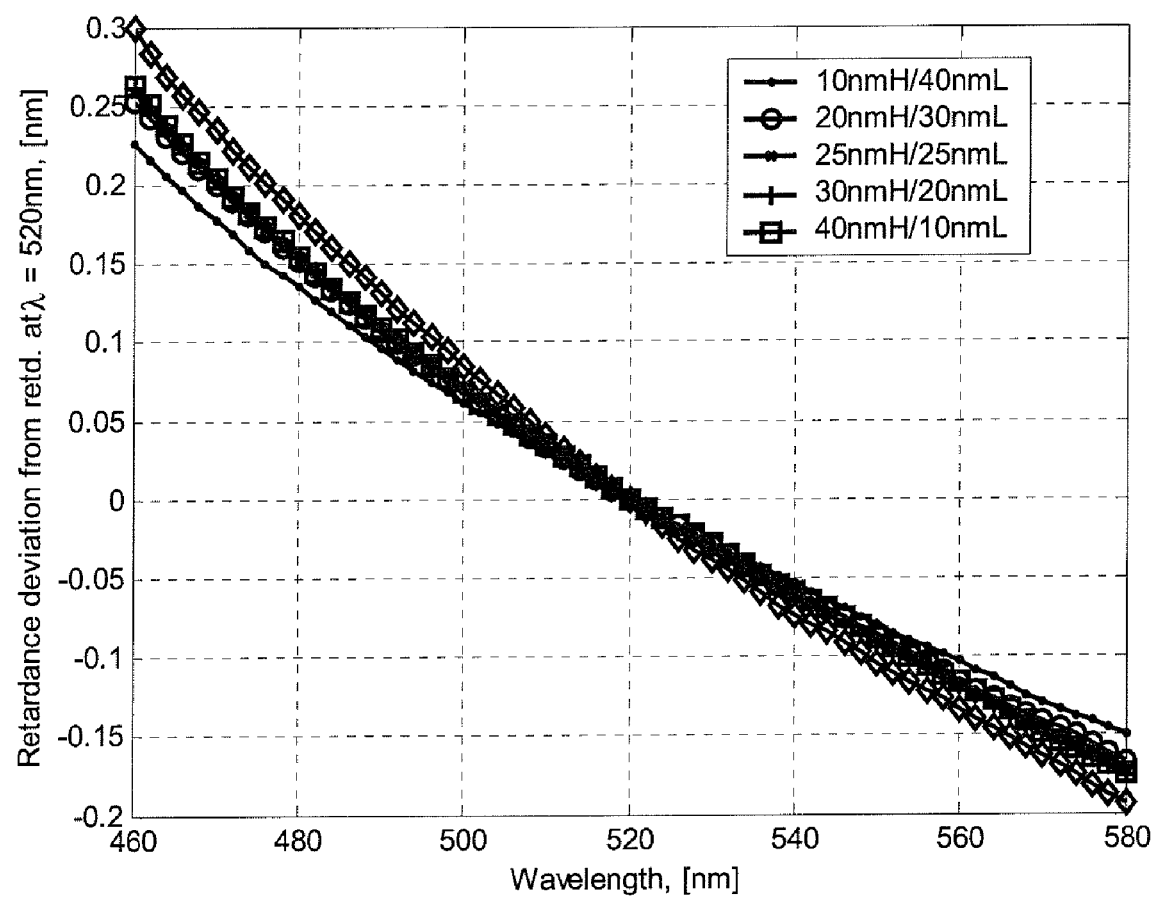
FIG. 23 shows the calculated retardance deviation spectra from the 7° tilted negative C-plate retardance at $\lambda=520$ nm for several dielectric FBAR designs.

The deviation spectra of retardance at 7 AOI and λ=520 nm are shown in FIG. 23. It's found that the higher the 'H' fraction within the repeat segment, the more dispersive the C-retardance becomes (e.g., the ninth design). Hence, the 10 nmH/40 mL design (e.g., the fifth design) is the most favored design. However, choosing an 'H' and 'L' paired thickness that is not close to a 50:50 ratio reduces the effective form-birefringence. Accordingly, the best and the worst dispersive designs in the five examples require significantly more layers to yield the same amount of C-retardance. It is noted that C-retardance quantities referred to here have been cast into an equivalent off-axis retardance effects of a single-layer uniaxial negative C-plate retarder having refractive indices of {1.655, 1.502} at λ=520 nm (and full index dispersion at other wavelengths provided for). The C-retardance quantities referenced to the resultant extraordinary and ordinary indices may be quite different from the results reported here.

Figure 24:
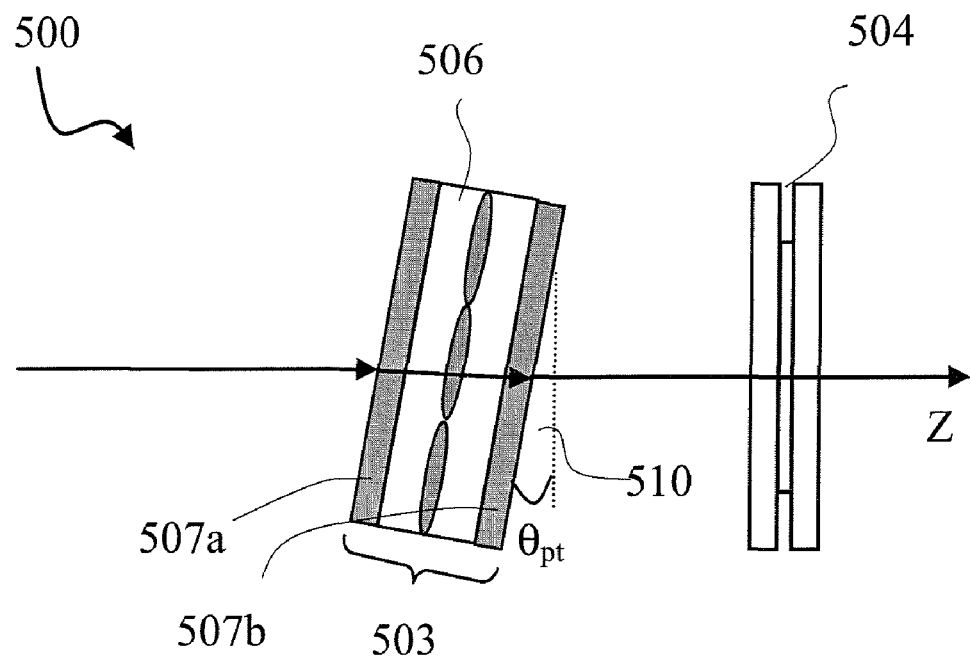
FIG. 24 is a schematic diagram of a retarder compensator in accordance with another embodiment of the instant invention disposed in front of a TN xLCD panel along a plane containing the fast-axis of the TN xLCD panel.

Referring to FIG. 24, there is shown a schematic diagram of a retarder compensator in accordance with another embodiment of the instant invention. The retarder compensator is a compensating plate 503 shown in tandem with a TN xLCD panel 504, along a viewing plane containing the FA of the panel 504 at normal incidence (e.g., the FA of the panel is in the plane of the drawing). The compensating plate 503 includes an A-plate retarder 506, disposed between two negative C-plate retarders 507a, 507b. The combined retarder element 503 is tilted at an angle $\theta_{pt}$ relative to the plane of the TN xLCD panel 504 to form what is referred to as a tilted-plate retarder (TPR).

The A-plate retarder 506 is a birefringent element having its optic axis oriented parallel to the plane of the plate/layer (e.g., as indicated by the index ellipsoid used to illustrate the anisotropy). When the A-plate retarder element 506 is configured as a positive uniaxial element, the optic axis is also the slow axis. Some examples of materials suitable for fabricating the A-plate retarder 506 include stretched foil retarder, liquid crystal polymers, and single-crystal quartz. Optionally, the A-plate retarder 506 includes a supporting substrate.

Each of the −C-plate retarders 507a, 507b is a birefringent element having its optic axis oriented perpendicular to the plane of the plate/layer. While −C-plates do not generally provide any net retardation for normal-incident rays (i.e., normal incident light is unaffected by the birefringence), rays incident off-axis (i.e., at an angle to the optic axis) experience a net retardation that is proportional to the incident angle. In particular, the net retardance decreases with angle of incidence (e.g., in contrast to a +C-plate where the net retardance increases with angle of incidence). The −C-plate elements 507a, 507b are coupled to the A-plate 506 such that their optic axes are oriented perpendicular to the plane of the A-plate. Some examples of materials suitable for fabricating the −C-plates 507a, 507b include discotic liquid crystal and discotic birefringent polymer compounds. One particularly attractive method of fabricating the −C-plates 507a, 507b is to coat each side of the A-plate 506 with a form-birefringent anti-reflection (FBAR) coating.

As discussed above, the combined A-plate/−C-plate retarder element 503 is tilted within the sub-system 500 at an angle $\theta_{pt}$ relative to the plane of the TN xLCD panel 504. More specifically, the retarder compensator 503 is tilted at angle $\theta_{Pt}$ about a predetermined axis of rotation (not shown, but perpendicular to the plane of drawing). Since the A-plate indicatrix tilt angle θt is approximately 0°, the plate tilt angle $\theta_{pt}$ of the A-plate will typically be larger than the corresponding plate tilt angle of a Catersian retarder element utilizing an O-plate retarder.

In each of the embodiments described with reference to FIGS. 13a and 24, tilting of the A and/or O-plate is implemented in such a way to decrease the angle between the optic axis of the A/O-plate Cartesian retarder element and the transmission axis (e.g., z-axis) relative to the untilted configuration. Accordingly, the effective in-plane retardance of the A/O-plate is reduced and a larger linear retardance asymmetry about the cone axis is induced so as to match to the linear retardance slope of the TN panel along the same azimuthal plane. The inter-play between the net retardance of the Cartesian retarder element (e.g., the A-plate or O-plate) and the tilted −C-plate allows for the shaping of the effective retardance slope. Along one azimuthal direction, the net retardance of the tilted Cartesian retarder element counters that of the titled −C-plate retarder to produce a flat retardance profile. Along the opposite azimuthal direction (i.e., 180-degree offset), light rays propagate close to the optic axis of the tilted Cartesian retarder element and a steep retardance slope is obtained from the tilted −C-plate element.

In other words, tilting the A/O plate coated with one or more −C-plate coatings also provides another variable that can be adjusted so that the asymmetric linear retardance profile of the retarder compensator is matched/complementary to the asymmetric linear retardance profile of the TN xLCD panel in the off-state. In addition, tilting the A/O plate coated with one or more −C-plate coatings allows the tilted-plate retarder to be clocked away from an approximately crossed axis configuration about an axis that is non-parallel to the transmission axis such that the tilted-plate retarder at least partially cancels the panel circular retardance, thereby improving the TN xLCD panel contrast. Accordingly, the tilted-plate retarder also satisfies the fourth requirement (d) discussed above.

As discussed above, the tilt of the compensating plate introduces a slope in the linear retardance that can be matched to the panel linear retardance asymmetry. In particular, the compensating plate is tilted about an axis of rotation selected to provide a retardance asymmetry similar to the retardance asymmetry of the liquid crystal panel. Advantageously, the tilted plate retarder functions as Cartesian retarder, where the slow axis is set by the A-plate or O-plate. When the tilted plate retarder is clocked away from cross-axed configuration, the linear retardance asymmetry thereof is aligned with the panel linear retardance asymmetry along the same azimuthal plane, while the in-plane component of the tilted A-plate or O-plate retarder anchors the slow-axis of the retarder compensator at the required orientation.

Advantageously, the panel compensation discussed above is accomplished with fewer components than many prior art techniques of panel compensation. For example, according to several prior art compensation techniques, compensation of the TN xLCD panel is provided by a compensation structure including a first O-plate disposed on a first side of the LC layer and a second O-plate disposed on a second opposite side of the LC layer. In H. Mori, M. Nagai, H. Nakayama, Y. Itoh, K. Kamada, K. Arakawa, and K. Kawata, "Novel Optical Compensation Method Based upon a Discotic Optical Compensation Film for Wide-Viewing-Angle LCDS," SID 03 Digest 1058-1061 (2003), the two O-plates are formed from discotic film. In T. Bachels, J. Funfschilling, H. Seiberle, M. Schadt, G. Gomez, and E. Criton, "Novel Photo-aligned LC Polymer Wide View Film for TN Displays," Eurodisplay 2002, p 183, and in J. Chen, K. C. Chang, J. DelPico, H. Seiberle and M. Schadt, "Wide viewing angle Photoaligned Plastic Films for TN-LCDS," SID 99 Digest, p 98-101, 1999, the two O-plates are formed from LCP. In each of these references, each of the O-plates (termed tilted A-plates in the latter reference) is parallel to the plane of the LC layer. According to the embodiments of the instant invention discussed above, compensation of the TN xLCD panel is achieved with only one compensation plate (e.g., having a single O-plate), which is non-parallel to the plane of the LC layer.

Of course, the above embodiments have been provided as examples only. It will be appreciated by those of ordinary skill in the art that various modifications, alternate configurations, and/or equivalents will be employed without departing from the spirit and scope of the invention.

For example, the tilted-plate retarder is not limited to compensating for a TN xLCD panel configured as 90 degree twist panel, having a LH twist, having its twist span located in the $4^{th}$ quadrant, and/or having entrance/exit LC directors parallel to the x- and y-axes. In one embodiment, the tilted retarder compensator is used for improving contrast ratio in a TN90 cell having a right-handed (RH) twist. In another embodiment, the tilted retarder compensator is used for improving contrast ratio of a non-90 degree TN cell having its entrance/exit azimuthal planes located as required.

In addition, the instant invention is not limited to positioning the tilted-plate retarder between the pre-polarizer and the xLCD imager and/or in a convergent or divergent cone of illumination. Note, however, that with any insertion of a tilted-plate optical element in a convergent/divergent imaging system, aberrations in the forms of coma and astigmatisms may be induced by the plate tilt. If the tilted-plate retarder is placed adjacent to the TN xLCD panel, between the input polarizer and output analyzer, then aberrations resulting from the tilted plate may degrade the illumination property (i.e., since it is in the illumination path), but will not impair the final image quality on the screen (i.e., because the projection path does not contain the tilted-plate retarder). It is noted also that in low pixel resolution panels (e.g., 720p panel with low tens of micron pixel pitch), the aberrations induced by the tilted-plate retarder may not cause an appreciable modulation transfer function (MTF) drop, even if the tilted-plate is located in the projection path.

Furthermore, the tilted-plate retarder is not limited to being inclined freely in air incidence. For example, in one embodiment the tilted-plate retarder is immersed a relatively dense isotropic optical medium (e.g., either solid or liquid) so that the entrance and/or exit planes of the retarder compensator are substantially parallel to the TN xLCD (e.g., although the A/O-plate itself is still tilted with respect to the transmission axis).

Figure 25:
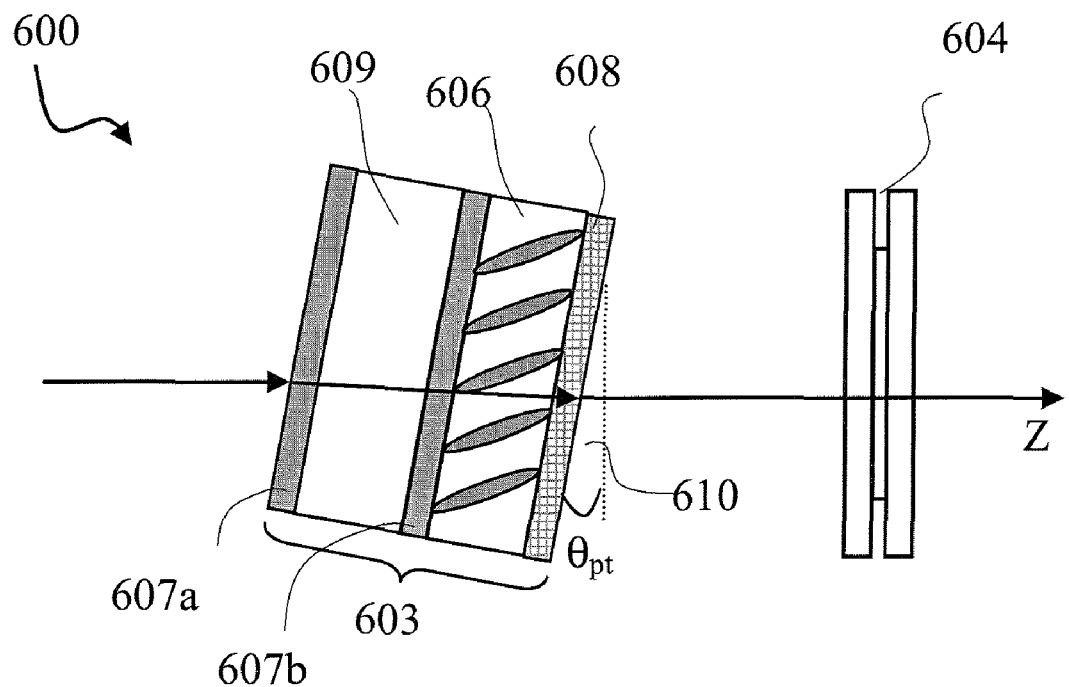
FIG. 25 is a schematic diagram of a retarder compensator in accordance with another embodiment of the instant invention disposed in front of a TN xLCD panel.

In each of the above-described embodiments the tilted-plate retarder has been described as including a tilted A/O-plate sandwiched between two −C-plates. While using two −C-plates is advantageous for equalizing stress on the O-plate retarder and/or its optional supporting substrate, it is also within the scope of the instant invention to provide only one −C-plate and/or to use a different configuration. For example, in one embodiment, the single −C-plate birefringent element is mounted before or after the Cartesian retarder with respect to light propagation sequence and the complete compensation plate is mounted before or after the microdisplay panel also with respect to light propagation sequence in such a way as to reduce the circular retardance of a system of panel and compensator. In yet another embodiment, which is illustrated in FIG. 25, the tilted plate retarder 603 includes a first FBAR coating stack 607a disposed on a first side of a substrate 609 (e.g., a transparent glass substrate) and a second FBAR coating stack 607b disposed on a second opposite side of the substrate 609. An O-plate 606 is provided on one side of the FBAR coated substrate (e.g., a LCP layer). For example, in one embodiment, the O-plate 606 is mounted on the second side of the FBAR coated substrate. The opposite side of the O-plate 606 is provided with an AR coating 608 to reduce reflections. The entire compensating plate 603 is tilted relative to a plane of the liquid crystal display panel 604 at an angle denoted by $\theta_{pr}$. Notably, this order of the FBAR stacks 607a/607b and the O-plate 606 with regards to the light propagation and the panel 604 has been shown, with modeling results, to provide improved circular retardance compensation of the TN xLCD panel 604. Of course, alternative configurations are also possible (e.g., the O-plate could be deposited on the FBAR coated substrate on the incident side).

In addition, in each of the above-described embodiments the tilted-plate retarder is configured with only one A-plate or O-plate. In other embodiments, the tilted-plate retarder is configured with more than one layer of Cartesian based retarder elements (e.g., multiple liquid crystal polymer layers) in order to generate the required circular retardance. Optionally, multiple layers of Cartesian retarder elements are also used to generate −C-plate functionality.

Moreover, in each of above-described embodiments the tilted plate retarders have been described as including uniaxial birefringent materials. Optionally, the tilted plate retarders utilize biaxial materials. In fact, in practice it is often difficult to fabricate truly uniaxial layers (e.g., some liquid crystal polymers considered to be uniaxial may have a biaxial component).

Note that while only one tilted-plate retarder is shown for contrast compensation, it is also within the scope of the instant invention to provide more than one tilted-plate retarder. Accordingly, the scope of the invention is therefore intended to be limited solely by the scope of the appended claims.

The invention claimed is:

1. A liquid crystal display projection system comprising:
  a light source;
  a first polarizer for receiving light from the light source, the first polarizer having a transmission axis oriented to transmit light having a first polarization;
  a liquid crystal display panel for receiving light transmitted through the first polarizer and for selectively modulating said transmitted light;
  a second polarizer for receiving light transmitted through the liquid crystal display panel, the second polarizer having a transmission axis oriented substantially perpendicular to the transmission axis of the first polarizer; and
  a compensating plate including:
    a first birefringent element having an optic axis oriented at a first angle to the plate normal, the first angle greater than zero degrees;
    a second birefringent element having an optic axis oriented at a second angle to the plate normal, the second angle substantially equal to zero degrees,
    wherein the compensating plate is tilted relative to a plane of the liquid crystal display panel.

2. A liquid crystal display projection system according to claim 1, wherein the first birefringent element comprises a positive uniaxial birefringent material.

3. A liquid crystal display projection system according to claim 2, wherein the first birefringent element comprises a liquid crystal polymer.

4. A liquid crystal display projection system according to claim 1, wherein the second birefringent element comprises a first form-birefringent anti-reflection coating disposed on a first side of the first birefringent element.

5. A liquid crystal display projection system according to claim 4, comprising a second form-birefringent anti-reflection coating disposed on a second opposite side of the first birefringent element.

6. A liquid crystal display projection system according to claim 4, comprising an anti-reflection coating disposed on a second opposite side of the first birefringent element.

7. A liquid crystal display projection system according to claim 1, wherein the compensating plate includes a transparent supporting substrate.

8. A liquid crystal display projection system according to claim 1, wherein the compensating plate is disposed between the first and second polarizers.

9. A liquid crystal display projection system according to claim 1, wherein the first angle is between 15 and 60 degrees.

10. A liquid crystal display projection system according to claim 9, wherein the first angle is between 20 and 40 degrees.

11. A liquid crystal display projection system according to claim 1, wherein the compensating plate is tilted relative to the plane of the liquid crystal display panel at an angle between 0 and about 12 degrees.

12. A liquid crystal display projection system according to claim 1, wherein the liquid crystal display panel comprises a twisted nematic liquid crystal layer.

13. A liquid crystal display projection system according to claim 12, wherein the twisted nematic liquid crystal layer has a slow axis in a first quadrant, the first quadrant adjacent a second quadrant spanning the liquid crystal twist angles when the twisted nematic liquid crystal is driven in a dark state.

14. A liquid crystal display projection system according to claim 12, wherein the compensating plate is tilted relative to the plane of the liquid crystal display panel such that the optic axis of the first birefringent element is oriented at a third angle to a normal of the plane of the twisted nematic liquid crystal display panel, the first angle larger than the third angle.

15. A liquid crystal display projection system according to claim 12, wherein the compensating plate is tilted about an axis of rotation selected to provide a retardance asymmetry complementary to a retardance asymmetry of the liquid crystal panel.

16. A liquid crystal display projection system according to claim 12, wherein the compensating plate is clocked away from a cross-axes configuration about an axis parallel to the plate normal.

17. A method of improving contrast ratio in a liquid crystal display projection system, the method comprising:
  providing a compensating plate including a first birefringent element having an optic axis oriented at a first angle to the plate normal, the first angle greater than zero degrees, and a second birefringent element having an optic axis oriented at a second angle to the plate normal, the second angle substantially equal to zero degrees; and
  positioning the compensating plate such that it is tilted relative to a liquid crystal display panel in the liquid crystal display projection system.

18. A method of improving contrast ratio according to claim 17, wherein positioning the compensating plate comprises tilting the compensating plate about an axis of rotation substantially parallel to a slow axis of the liquid crystal display panel.

19. A method of improving contrast ratio according to claim 17, wherein positioning the compensating plate comprises tilting the compensating plate about an axis of rotation disposed in a same quadrant as a slow axis of the liquid crystal display panel.

20. A method of improving contrast ratio according to claim 19, comprising rotating the compensating plate about an axis parallel to the plate normal such that the contrast ratio is increased.

21. A method of improving contrast ratio according to claim 17, comprising rotating the compensating plate about an axis parallel to the plate normal such that the contrast ratio is increased.

22. A liquid crystal display projection system comprising:
  a light source;
  a first polarizer for receiving light from the light source, the first polarizer having a transmission axis oriented to transmit light having a first polarization;
  a liquid crystal display panel for receiving light transmitted through the first polarizer and for selectively modulating said transmitted light;
  a second polarizer for receiving light transmitted through the liquid crystal display panel, the second polarizer having a transmission axis oriented substantially perpendicular to the transmission axis of the first polarizer; and a compensating plate including:
  a first birefringent element having uniaxial O-plate symmetry;
  a second birefringent element having uniaxial C-plate symmetry;
  wherein the compensating plate is tilted relative to a plane of the liquid crystal display panel.

23. A liquid crystal display projection system according to claim 22, wherein the first birefringent element comprises a liquid crystal polymer.

24. A liquid crystal display projection system according to claim 23, wherein the second birefringent element comprises a form-birefringent anti-reflection coating disposed on at least one of the first birefringent element and a substrate supporting the first birefringent element.

25. A liquid crystal display projection system according to claim 24, wherein the liquid crystal display panel comprises a twisted nematic liquid crystal layer.

* * * * *